United States Patent
Taniguchi et al.

(10) Patent No.: US 7,248,399 B2
(45) Date of Patent: Jul. 24, 2007

(54) OPTICAL FIBER FOR RAMAN AMPLIFICATION, OPTICAL FIBER COIL, RAMAN AMPLIFIER, AND OPTICAL COMMUNICATION SYSTEM

(75) Inventors: Yuki Taniguchi, Tokyo (JP); Yoshihiro Emori, Tokyo (JP); Ryuichi Sugizaki, Tokyo (JP); Atsushi Oguri, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/326,356

(22) Filed: Jan. 6, 2006

(65) Prior Publication Data

US 2006/0126162 A1 Jun. 15, 2006

Related U.S. Application Data

(63) Continuation of application No. PCT/JP2005/007161, filed on Apr. 13, 2005.

(30) Foreign Application Priority Data

May 20, 2004 (JP) ............................. 2004-150929

(51) Int. Cl.
*H01S 4/00* (2006.01)
*H04B 10/12* (2006.01)

(52) U.S. Cl. ...................... 359/334; 385/127; 385/128

(58) Field of Classification Search ................ 359/334; 385/126, 127
See application file for complete search history.

(56) References Cited

U.S. PATENT DOCUMENTS

| | | |
|---|---|---|
| 7,006,742 B2 | 2/2006 | Takahashi et al. |
| 2002/0057880 A1* | 5/2002 | Hirano et al. ................ 385/127 |
| 2002/0181077 A1* | 12/2002 | Kakui et al. ................. 359/334 |
| 2003/0210878 A1 | 11/2003 | Kumano et al. ............. 385/127 |

FOREIGN PATENT DOCUMENTS

| | | |
|---|---|---|
| JP | 2002-207136 | 7/2002 |
| JP | 2002-277911 | 9/2002 |
| JP | 2002-374021 | 12/2002 |
| JP | 2003-255169 | 9/2003 |

OTHER PUBLICATIONS

U.S. Appl. No. 11/326,356, filed Jan. 6, 2006, Taniguchi et al.

* cited by examiner

*Primary Examiner*—Jack Keith
*Assistant Examiner*—Eric Bolda
(74) *Attorney, Agent, or Firm*—Oblon, Spivak, McClelland, Maier & Neustadt, P.C.

(57) ABSTRACT

An optical fiber for Raman amplification amplifies a signal light with a pumping light. A chromatic dispersion at a wavelength of 1,550 nm is in a range between −70 ps/nm/km and −30 ps/nm/km. Raman gain efficiency with a pumping light of 1,450 nm is equal to or more than 5 $(W \times km)^{-1}$. Nonlinear coefficient at the wavelength of 1,550 nm is equal to or less than $5.0 \times 10^{-9}$ $W^{-1}$. Zero-dispersion wavelength is neither at a wavelength of the signal light nor at a wavelength of the pumping light. Cut-off wavelength is equal to or less than the wavelength of the pumping light.

7 Claims, 16 Drawing Sheets

FIG.3

| ITEM | 101 | 102 | 103 | 104 | 105 | 106 | 107 | 401 | 402 | 403 |
|---|---|---|---|---|---|---|---|---|---|---|
| CHROMATIC DISPERSION [ps/nm/km] | -69.3 | -60.0 | -53.0 | -55.5 | -47.4 | -38.6 | -30.5 | -21.8 | -15.5 | -11.2 |
| DISPERSION SLOPE [ps/nm²/km] | -0.014 | -0.006 | -0.006 | -0.006 | -0.004 | -0.001 | 0.003 | 0.009 | 0.015 | 0.020 |
| $A_{eff,S}$ [µm²] FOR SIGNAL LIGHT OF 1,550 nm | 10.8 | 10.4 | 10.3 | 10.4 | 10.2 | 10.1 | 10.2 | 10.3 | 10.6 | 10.8 |
| $A_{eff,P}$ [µm²] FOR PUMPING LIGHT OF 1,450 nm | 9.1 | 9.0 | 8.9 | 8.9 | 8.9 | 9.0 | 9.1 | 9.3 | 9.6 | 9.8 |
| $A_{eff,R}$ [µm²] CALCULATED FROM EQUATION (5) | 9.9 | 9.7 | 9.6 | 9.6 | 9.6 | 9.6 | 9.6 | 9.8 | 10.1 | 10.3 |
| $g_R/A_{eff,R}$ [(W·km)⁻¹] WITH PUMPING LIGHT OF 1,450 nm | 6.0 | 6.4 | 6.5 | 6.5 | 6.6 | 6.6 | 6.5 | 6.1 | 5.4 | 5.3 |
| $n_2/A_{eff,S}$ [$10^{-9}$ (W)⁻¹] | 4.1 | 4.3 | 4.3 | 4.3 | 4.4 | 4.5 | 4.4 | 4.3 | 4.2 | 4.1 |
| $\lambda_0$ [nm] | - | - | - | - | - | - | - | - | - | - |
| $\lambda_c$ [nm] | 956 | 1005 | 1040 | 1030 | 1063 | 1121 | 1172 | 1249 | 1300 | 1350 |
| BENDING LOSS [dB/m] at 20 mm φ | - | - | - | - | - | - | - | - | - | - |
| SECOND CORE DIAMETER b [µm] | 5.8 | 6.1 | 6.3 | 6.2 | 6.4 | 6.6 | 7.0 | 7.2 | 7.8 | 8.3 |
| OUTER DIAMETER OF GLASS PART [µm] | 115 | 120 | 125 | 82 | 84 | 87 | 90 | 93 | 120 | 130 |
| OUTER DIAMETER OF COATING PART [µm] | 245 | 246 | 247 | 141 | 142 | 143 | 144 | 145 | 246 | 248 |

FIG.5

| ITEM | 201 | 202 | 203 | 501 | 502 | 301 | 302 | 303 | 601 | 602 |
|---|---|---|---|---|---|---|---|---|---|---|
| CHROMATIC DISPERSION [ps/nm/km] | -46.0 | -42.4 | -34.5 | -27.7 | -15.7 | -55.2 | -43.5 | -34.8 | -27.8 | -13.3 |
| DISPERSION SLOPE [ps/nm$^2$/km] | -0.050 | -0.040 | -0.024 | -0.013 | 0.008 | -0.026 | -0.014 | -0.006 | -0.001 | 0.019 |
| $A_{eff,S}$ [μm$^2$] FOR SIGNAL LIGHT OF 1,550 nm | 11.0 | 10.9 | 10.9 | 11.0 | 11.3 | 11.0 | 10.8 | 10.8 | 10.8 | 11.2 |
| $A_{eff,P}$ [μm$^2$] FOR PUMPING LIGHT OF 1,450 nm | 9.6 | 9.6 | 9.7 | 9.8 | 10.2 | 9.4 | 9.4 | 9.5 | 9.6 | 10.2 |
| $A_{eff,R}$ [μm$^2$] CALCULATED FROM EQUATION (5) | 10.3 | 10.3 | 10.3 | 10.4 | 10.8 | 10.2 | 10.1 | 10.2 | 10.2 | 10.7 |
| $g_R/A_{eff,R}$ [(W*km)$^{-1}$] WITH PUMPING LIGHT OF 1,450nm | 5.3 | 5.4 | 5.3 | 5.1 | 4.7 | 5.5 | 5.6 | 5.5 | 5.4 | 4.9 |
| $n_2/A_{eff,S}$ [$10^{-9}$(W)$^{-1}$] | 3.7 | 3.8 | 3.8 | 3.7 | 3.6 | 3.6 | 3.7 | 3.7 | 3.7 | 3.5 |
| $\lambda_0$ [nm] | - | - | - | - | - | - | - | - | - | - |
| $\lambda_c$ [nm] | 902 | 921 | 955 | 991 | 1066 | 924 | 997 | 1043 | 1086 | 1165 |
| BENDING LOSS [dB/m] at 20 mm φ | - | - | - | - | - | - | - | - | - | - |
| SECOND CORE DIAMETER b [μm] | 8.9 | 9.1 | 9.4 | 9.7 | 10.5 | 8.6 | 8.9 | 9.4 | 9.7 | 10.4 |
| OUTER DIAMETER OF GLASS PART [μm] | 82 | 83 | 87 | 90 | 87 | 82 | 86 | 90 | 84 | 90 |
| OUTER DIAMETER OF COATING PART [μm] | 141 | 142 | 143 | 144 | 143 | 142 | 143 | 144 | 142 | 144 |

| ITEM | C+L BAND | C BAND | L BAND |
|---|---|---|---|
| WAVELENGTH RANGE [nm] | 1530-1600 | 1530-1565 | 1565-1600 |
| CHANNEL INTERVAL [GHz] | 50 | 50 | 50 |
| NUMBER OF CHANNELS | 171 | 87 | 84 |
| PUMPING LIGHT WAVELENGTH [nm] | 1424,1438,1452 1468,1495 | 1424,1438,1465 | 1452,1467,1496 |
| PUMPING LIGHT POWER [mW] | 520,520, 200,310,90 | 270,410,230 | 190,460,250 |
| POWER CONVERSION EFFICIENCY [%] | 73 | 65 | 65 |
| NONLINEAR PHASE SHIFT [rad] | 0.06 ~ 0.08 | 0.06 ~ 0.08 | 0.06 ~ 0.08 |

FIG.11

| ITEM | 801 | 802 | 803 | 804 | 805 | 806 | 807 | 808 | 809 |
|---|---|---|---|---|---|---|---|---|---|
| CHROMATIC DISPERSION [ps/nm/km] | -85.0 | -78.3 | 69.9 | -64.2 | -51.9 | -43.4 | -35.7 | -28.3 | -21.4 |
| DISPERSION SLOPE [ps/nm²/km] | 0.036 | 0.024 | 0.013 | 0.009 | 0.003 | 0.002 | 0.004 | 0.007 | 0.011 |
| $g_R/A_{eff,R}$ [(W*km)$^{-1}$] WITH PUMPING LIGHT OF 1,450 nm | 5.8 | 6.0 | 6.2 | 6.3 | 6.3 | 6.4 | 6.3 | 6.2 | 6.2 |
| $n_2/A_{eff,S}$ [$10^{-9}$ (W)$^{-1}$] | 3.7 | 3.9 | 4.0 | 4.1 | 4.2 | 4.3 | 4.3 | 4.3 | 4.2 |
| $\lambda_0$ [nm] | - | - | - | - | - | - | - | - | - |
| $\lambda_c$ [nm] | 902 | 951 | 974 | 997 | 1063 | 1101 | 1150 | 1206 | 1252 |
| BENDING LOSS [dB/m] at 20 mm $\phi$ | - | - | - | - | - | - | - | - | - |
| SECOND CORE DIAMETER b [μm] | 4.9 | 5.1 | 5.3 | 5.5 | 5.8 | 6.0 | 6.3 | 6.7 | 7.0 |
| OUTER DIAMETER OF GLASS PART [μm] | 55 | 58 | 60 | 62 | 51 | 53 | 56 | 58 | 60 |
| OUTER DIAMETER OF COATING PART [μm] | 130 | 131 | 131 | 131 | 130 | 130 | 130 | 131 | 131 |

OPTICAL FIBER FOR RAMAN AMPLIFICATION, OPTICAL FIBER COIL, RAMAN AMPLIFIER, AND OPTICAL COMMUNICATION SYSTEM

CROSS-REFERENCE TO RELATED APPLICATIONS

This application is a continuation of PCT/JP2005/007161 filed on Apr. 13, 2005, the entire content of which are incorporated herein by reference.

BACKGROUND OF THE INVENTION

1. Field of the Invention

The present invention relates to an optical fiber for Raman amplification that amplifies a signal light with a pumping light, an optical fiber coil formed by winding the optical fiber for Raman amplification around a bobbin, a Raman amplifier including the optical fiber for Raman amplification, and an optical communication system including the Raman amplifier.

2. Description of the Related Art

Recently, broadband Internet services are steadily spread, from which it is clear that-there is a need for a backbone network having even larger capacity. For the past 10 years, a wavelength division multiplexing (WDM) has become a mainstream technology for increasing a capacity of an optical-fiber communication system. Signal wavelength bands need to be enlarged to expand the limit of the capacity.

From among many elements that form an optical communication system, an optical amplifier is a factor that limits a signal wavelength band. Presently, an optical amplifier used in current optical communication system is an erbium-doped fiber amplifier (EDFA). The gain bandwidth is limited to a wavelength range of approximately 1,530 nm to 1,565 nm, which is called C band, and a wavelength range of approximately 1,570 nm to 1,610 nm, which is called L band. Therefore, application to a band that cannot be amplified by the EDFA is being considered. Meanwhile, a fiber Raman-amplifier using stimulated Raman scattering in an optical fiber is able to amplify an arbitrary wavelength by appropriately selecting a pumping wavelength. Currently, the Raman amplifier is not widely applied to the C band or the L band because conventional Raman amplifier is poor in amplification efficiency compared to the EDFA.

In the Raman amplifier, optical fiber is used as an optical amplifying medium, and signal lights are Raman amplified by supplying-a pumping light to the optical fiber. Specifically, the Raman amplifier employs stimulated Raman scattering that is a nonlinear optical phenomenon in optical fiber.

Therefore, a highly nonlinear optical fiber is preferably used as the optical fiber for Raman amplification. For example, a Raman amplifier disclosed in Japanese Patent Application Laid Open No. 2002-277911 employs a highly nonlinear optical fiber as the optical fiber for Raman amplification to perform lumped optical amplification. An absolute value of chromatic dispersion at a wavelength of a signal light propagated through the optical fiber for Raman amplification is in a range between 6 ps/km/nm and 20 ps/km/nm.

In designing the conventional Raman amplifier, in addition to gain and noise figure (NF) that are basic parameters of an optical amplifier, multi-path interference (MPI) noise caused by double Rayleigh back scattering (DRBS) and nonlinear phase shift (NLPS) have been particularly attracting an attention. The gain and the NF are basic specifications determined by the system design. Therefore, the object in designing a single amplifier is to reduce the MPI noise and the NLPS as much as possible, with a condition that the characteristics of the gain and the NF are constant. A pumping power required for the amplification is also a guideline in the design of the amplifier, which can be referred to as amplification efficiency.

Generally, as the amplification fiber becomes shorter, the MPI noise and the NLPS become smaller. However, at the same time, amplification efficiency degrades, making a trade off between these factors. To reduce the NLPS, a nonlinear coefficient ($n_2/A_{eff,S}$) should be decreased, and to increase amplification efficiency, a Raman gain efficiency ($g_R/A_{eff,R}$) should be increased, where $n_2$ is a nonlinear refractive index, $A_{eff,S}$ is an effective area for the signal light, $g_R$ is a Raman gain coefficient, and $A_{eff,R}$ is an arithmetic average of effective areas at a signal wavelength and a pumping wavelength. As described above, the effective area is related to both the nonlinear coefficient and the Raman gain efficiency. Therefore, if either one of the nonlinear coefficient and the Raman gain efficiency is increased, the other increases as well, and therefore, there is a trade off between these characteristics as well. Under these conditions, the amplification fiber needs to be designed so that the characteristics, between which a trade off exists, are within tolerance levels.

Generally, nonlinear effects in optical fibers degrade transmission quality of WDM signals in many cases. Specifically, four wave mixing (FWM), self phase modulation (SPM), cross phase modulation (XPM), and stimulated Brillouin scattering (SBS) can be factors to degrade the transmission quality. In the FWM, a noise light that is similar to amplified spontaneous emission (ASE) is input to a detector with the signal light, thereby generating an intensity noise due to a random interference. The SPM and the XPM are phenomena in which a phase shift is generated according to a pattern of an intensity modulation signal because the refractive index of the glass is dependent on light intensity. Due to a combination of a dispersion of a transmission line and a temporal change of the phase shift (a change in instantaneous frequency), a waveform of the intensity modulation signal is distorted, resulting in an increased bit error rate.

A nonlinear phase shift (NLPS), which is generally used as a parameter for estimating a magnitude of the nonlinear effect, represents a magnitude of the SPM, and with only the NLPS, it is insufficient for estimating the effects of FWM and XPM that are largely affected by a dispersion of the optical fiber. For example, the FWM efficiency is low as long as the phase matching is not achieved. When using a highly nonlinear optical fiber in which an absolute value of chromatic dispersion at a signal light wavelength is in a range between 6 ps/nm/km and 20 ps/nm/km, as an optical fiber for Raman amplification, because the absolute value of the chromatic dispersion is not near zero, even if the NLPS is a relatively large value, it is possible to suppress the degradation of transmission performance of signal lights due to the FWM. Meanwhile, the magnitude of chromatic dispersion necessary for suppressing the XPM is assumed to be somewhat large compared to the case of the FWM, although the value is not confirmed.

SUMMARY OF THE INVENTION

It is an object of the present invention to at least solve the problems in the conventional technology.

An optical fiber for Raman amplification according to one aspect of the present invention includes a glass part and a coating surrounding the glass part. A chromatic dispersion at a wavelength of 1,550 nm is in a range between −70 ps/nm/km and −30 ps/nm/km. Raman gain efficiency with a pumping light of 1,450 nm is equal to or more than 5 $(W\times km)^{-1}$. Nonlinear coefficient at a wavelength of 1,550 nm is equal to or less than $5.0\times 10^{-9}$ $W^{-1}$. Zero-dispersion wavelength is neither at a wavelength of the signal light nor at a wavelength of the pumping light. Cut-off wavelength is equal to or less than a wavelength of the pumping light.

An optical fiber coil according to another aspect of the present invention includes an optical fiber for Raman amplifying a signal light with a pumping light, and a bobbin around which the optical fiber is wound. A chromatic dispersion of the optical fiber at a wavelength of 1,550 nm is in a range between −70 ps/nm/km and −30 ps/nm/km. Raman gain efficiency of the optical fiber with a pumping light of 1,450 nm is equal to or more than 5 $(W\times km)^{-1}$. Nonlinear coefficient of the optical fiber at a wavelength of 1,550 nm is equal to or less than $5.0\times 10^{-9}$ $W^{-1}$. Zero-dispersion wavelength of the optical fiber is neither at a wavelength of the signal light nor at a wavelength of the pumping light. Cut-off wavelength of the optical fiber is equal to or less than a wavelength of the pumping light.

A Raman amplifier according to still another aspect of the present invention includes an input unit to which a signal light is input, an output unit from which amplified signal light is output, a first optical fiber for Raman amplifying a signal light with a pumping light provided in at least a part between the input unit and the output unit, and a pumping light source that supplies a pumping light to the first optical fiber. A chromatic dispersion of the first optical fiber at a wavelength of 1,550 nm is in a range between −70 ps/nm/km and −30 ps/nm/km. Raman gain efficiency of the first optical fiber with a pumping light of 1,450 nm is equal to or more than 5 $(W\times km)^{-1}$. Nonlinear coefficient of the first optical fiber at a wavelength of 1,550 nm is equal to or less than $5.0\times 10^{-9}$ $W^{-1}$. Zero-dispersion wavelength of the first optical fiber is neither at a wavelength of the signal light nor at a wavelength of the pumping light. Cut-off wavelength of the first optical fiber is equal to or less than a wavelength of the pumping light.

An optical communication system according to still another aspect of the present invention includes a Raman amplifier that Raman amplifies a signal light. The Raman amplifier includes an input unit to which a signal light is input, an output unit from which amplified signal light is output, an optical fiber for Raman amplifying a signal light with a pumping light provided in at least a part between the input unit and the output unit, and a pumping light source that supplies a pumping light to the optical fiber. A chromatic dispersion of the optical fiber at a wavelength of 1,550 nm is in a range between −70 ps/nm/km and −30 ps/nm/km. Raman gain efficiency of the optical fiber with a pumping light of 1,450 nm is equal to or more than 5 $(W\times km)^{-1}$. Nonlinear coefficient of the optical fiber at a wavelength of 1,550 nm is equal to or less than $5.0\times 10^{-9}$ $W^{-1}$. Zero-dispersion wavelength of the optical fiber is neither at a wavelength of the signal light nor at a wavelength of the pumping light. Cut-off wavelength of the optical fiber is equal to or less than a wavelength of the pumping light.

An optical communication system according to still another aspect of the present invention includes a Raman amplifier that Raman amplifies a signal light. The Raman amplifier includes an input unit to which a signal light is input, an output unit from which amplified signal light is output, an optical fiber for Raman amplifying a signal light with a pumping light provided in at least a part between the input unit and the output unit, and a pumping light source that supplies a pumping light to the optical fiber. A chromatic dispersion of the optical fiber at a wavelength of the signal light is equal to or less than −7.39×Pout/S [ps/nm/km], where Pout is a signal power at an output end of the optical fiber, and S is a wavelength interval between adjacent wavelength-division-multiplexed signals. Raman gain efficiency of the optical fiber with a pumping light of 1,450 nm is equal to or more than 5 $(W\times km)^{-1}$. Nonlinear coefficient of the optical fiber at a wavelength of 1,550 nm is equal to or less than $5.0\times 10^{-9}$ $W^{-1}$. Zero-dispersion wavelength of the optical fiber is neither at a wavelength of the signal light nor at a wavelength of the pumping light. Cut-off wavelength of the optical fiber is equal to or less than a wavelength of the pumping light.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of measured parameters of a group of the optical fibers for Raman amplification according to the present invention;

FIG. 5 is a table of measured parameters of another group of the optical fibers for Raman amplification according to the present invention;

FIG. 11 is a table of measured parameters of still another group of the optical fibers for Raman amplification according to the present invention;

DETAILED DESCRIPTION OF THE PREFERRED EMBODIMENTS

Figure 1:
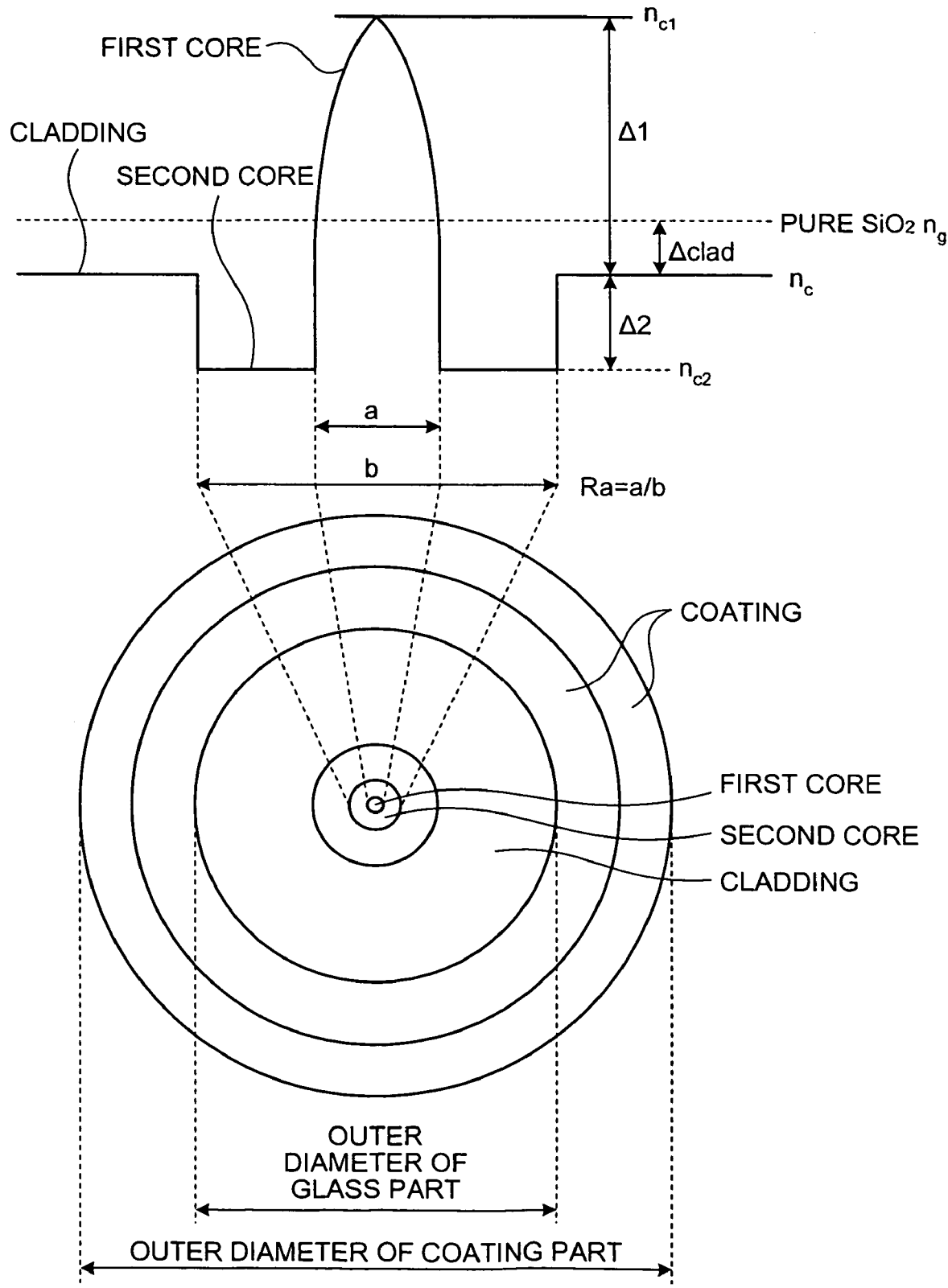
FIG. 1 is a schematic for illustrating a refractive index profile and a cross section of an optical fiber for Raman amplification according to the present invention.

Exemplary embodiments of the present invention will be described below in detail with reference to the accompanying drawings. In the following description, common components are denoted by the same reference numerals and overlapping descriptions are omitted to avoid redundant explanations. The diagrams are not to the scale.

FIG. 1 is a schematic for illustrating a refractive index profile and a cross section of an optical fiber for Raman amplification according to the present invention.

The optical fiber includes a glass part substantially made of silicon dioxide ($SiO_2$) and a coating surrounding the glass part. The glass part includes a first core having a diameter a, a second core that surrounds the first core and has a diameter b and a refractive index smaller than that of the first core, and a cladding that surrounds the second core and has a refractive index smaller than that of the first core and larger than that of the second core. The outer circumference of the glass part is a coating of two layers of ultraviolet light curing resin. Typically, the outer diameter of the glass part is 125 μm, and the outer diameter of the coating is 250 μm.

In the present specification, the first core diameter a and the second core diameter b are defined as follows. The first core diameter a corresponds to a length of a line that connects positions at which the relative refractive index difference is the same as that of the cladding at a boundary between the first core and the second core. The second core diameter b is corresponds to a length of a line that connects positions at which the relative refractive index difference becomes half of that of Δ2 at a boundary between the second core and the cladding.

Typically, the cladding is made of substantially pure $SiO_2$. However, germanium dioxide ($GeO_2$) or fluorine (F) can be doped optionally. The fact that the cladding is made of substantially pure $SiO_2$ means that the cladding does not contain a dopant such as $GeO_2$ or F to greatly change the refractive index, but can contain chlorine (Cl) or the like. Moreover, the refractive index profile can be changed by adjusting the amount of $GeO_2$ or F. The refractive index increases when $GeO_2$ is doped, and decreases when F is doped.

It is assumed that a ratio of the first core diameter a to the second core diameter b is Ra (Ra=a/b), a relative refractive index difference of the first core to the cladding is Δ1, and a relative refractive index difference of the second core to the cladding is Δ2. A relative refractive index difference of the cladding to a refractive index of pure $SiO_2$ glass is Δclad. Thus, when the cladding is made of substantially pure $SiO_2$, Δclad=0%.

In the present specification, the relative refractive index differences Δ1, Δ2, and Δclad are obtained from Equations (1) to (3)

$$\Delta 1 = [(n_{c1} - n_c)/n_{c1}] \times 100 \quad (1)$$

$$\Delta 2 = [(n_{c2} - n_c)/n_{c2}] \times 100 \quad (2)$$

$$\Delta clad = [(n_c - n_g)/n_c] \times 100 \quad (3)$$

where $n_{c1}$ is a maximum refractive index of the first core, $n_{c2}$ is a minimum refractive index of the second core, $n_g$ is a refractive index of pure silica, and $n_c$ is a refractive index of the cladding.

In the optical fiber for Raman amplification, a chromatic dispersion value is from −70 ps/nm/km to −30 ps/nm/km at a wavelength of 1,550 nm, a Raman gain efficiency is 5 $(W \times km)^{-1}$ or more with a pumping light of 1,450 nm, a nonlinear coefficient is $5.0 \times 10^{-9}$ $W^{-1}$ or less at a wavelength of 1,550 nm, a zero-dispersion wavelength $\lambda_0$ is neither at a wavelength of the signal light nor at a wavelength of the pumping light, and a cut-off wavelength $\lambda_c$ is equal to or less than a wavelength of the pumping light.

In the present specification, the cut-off wavelength $\lambda_c$ is defined by International Telecommunication Union Telecommunication Standardization Sector (ITU-T) G.650.1. Other terminologies described below conform to a definition and a measurement method defined in ITU-T G.650.1. A nonlinear coefficient ($n_2/A_{eff,s}$) is a measurement value according to the XPM method.

The optical fiber for Raman amplification is able to increase the Raman gain efficiency while suppressing the nonlinear coefficient, because the chromatic dispersion value at a wavelength of 1,550 nm is set as described above. Furthermore, the optical fiber for Raman amplification,is able to perform Raman amplification on a signal light in a highly efficient manner, because the Raman gain efficiency with a pumping light of 1,450 nm is set as described above. Moreover, the optical fiber for Raman amplification is able to suppress distortion of signal light waveforms caused by self-phase modulation and cross-phase modulation, because the nonlinear coefficient at a wavelength of 1,550 nm is set as described above. Likewise, distortion of signal light waveforms and pumping light waveforms caused by four-wave mixing is suppressed, because the zero-dispersion wavelength $\lambda_0$ is not at the signal light wavelength and the pumping light wavelength as described above. Further, because the cut-off wavelength $\lambda_c$ is set as described above, the pumping light can be propagated in a single mode, so that pumping light energy is effectively used.

The following is a theoretical description of respective relationships between the chromatic dispersion value to the Raman gain efficiency and the nonlinear coefficient of the optical fiber for Raman amplification.

Firstly, the Raman gain efficiency ($g_R/A_{eff,R}$) of the optical fiber for Raman amplification is described. A Raman gain coefficient $g_R$ is determined by core composition of the optical fiber (first core and second core). A Raman effective area $A_{eff,R}$ changes depending on the chromatic dispersion value, even if the core composition is the same. The Raman effective area $A_{eff,R}$ is determined by an overlap of a pumping light and a signal light in the direction of the diameter of the optical fiber, and is obtained from Equation (4) according to "European Conference on Optical Communication (ECOC) 2002, Symposium 3.3 (2002)"

$$A_{eff,R} = A_{eff}^{ps}(\omega_s, \omega_p) = \int_A |R_s|^2 dA \int_A |R_p|^2 dA \bigg/ \int_A |R_s|^2 \int_A |R_p|^2 dA \quad (4)$$

where subscript s indicates a signal light and subscript p indicates a pumping light, $\omega_i$ is angular frequency, and $R_i(r, \omega_i)$ is a transverse component of an electric field (hereinafter the same). The integral range of Equation (4) corresponds to the entire cross-sectional area A of the optical fiber for Raman amplification.

Even without using Equation (4), if $R_i(r, \omega_i)$ is set as a Gaussian function, the Raman effective area $A_{eff,R}$ can be obtained as the average of an effective area $A_{eff,p}$ of a pumping light and an effective area $A_{eff,s}$ of a signal light, from $$A_{eff,R} = (A_{eff,P} + A_{eff,S})/2 \qquad (5)$$

According to "Optoelectronics and Communications Conference 2003 (OECC2003) 15A2-3 (2003)", the Raman effective area $A_{eff,R}$ obtained by Equation (5) sufficiently approximates that obtained by Equation (4).

Next, the nonlinear coefficient $(n_2/A_{eff,s})$ of the optical fiber for Raman amplification is described. Similarly to the Raman gain coefficient $g_R$, the nonlinear refractive index $n_2$ is determined by core composition of the optical fiber for Raman amplification. Thus, with the same core composition, the nonlinear coefficient $(n_2/A_{eff,s})$ is maximum when the effective area of the signal light $A_{eff,s}$ is minimum.

Figure 2:
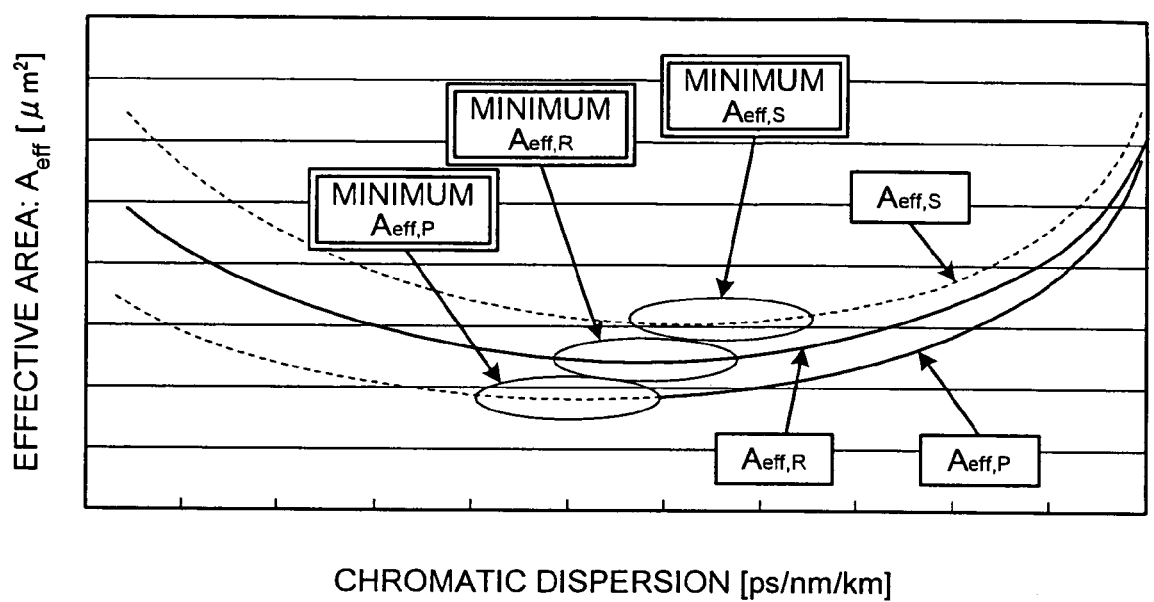
FIG. 2 is a graph of a correlation between chromatic dispersion and effective area of the optical fiber for Raman amplification according to the present invention.

Next, the respective relationships between the chromatic dispersion value to $A_{eff,R}$, $A_{eff,p}$, and $A_{eff,s}$ in the optical fiber for Raman amplification are described. As an example, the chromatic dispersion values, $A_{eff,R}$, $A_{eff,p}$, and $A_{eff,s}$ are calculated from electric field distributions of light in the optical fiber for Raman amplification having the refractive index profile shown in FIG. 1. The calculation results are schematically shown in FIG. 2. The chromatic dispersion is changed by changing the second core diameter b while fixing the ratio Ra of the first core diameter a to the second core diameter b. The chromatic dispersion value (ps/nm/km) of the optical fiber for Raman amplification when the wavelength is 1,550 nm is plotted on the horizontal axis as shown in FIG. 2. The effective area $A_{eff,s}$ square micrometers ($\mu m^2$) at the signal light wavelength of 1,550 nm, the effective area $A_{eff,p}$ $\mu m^2$ at the pumping light wavelength of 1,450 nm, and the Raman effective area $A_{eff,R}$ $\mu m^2$ at the signal light wavelength of 1,550 nm and the pumping light wavelength of 1,450 nm obtained by Equation (4), are plotted on the vertical axis.

In the optical fiber for Raman amplification, the Raman effective area $A_{eff,R}$ is minimized in a certain chromatic dispersion region. Thus, with the same core, the Raman gain efficiency $(g_R/A_{eff,R})$ is maximized when the Raman effective area $A_{eff,R}$ is minimized. On the other hand, the nonlinear coefficient $(n_2/A_{eff,s})$ is maximum in the chromatic dispersion region where the effective area of the signal light $A_{eff,s}$ is minimum.

Furthermore, the chromatic dispersion region in which the effective area $A_{eff,p}$ of the pumping light is minimum, and the chromatic dispersion region in which the effective area $A_{eff,s}$ of the signal light is minimum are different, and the Raman effective area $A_{eff,R}$ is obtained by Equation (5). Therefore, in an appropriate chromatic dispersion region in which the effective area $A_{eff,p}$ of the pumping light is minimum, it is possible to reduce the nonlinear coefficient $(n_2/A_{eff,s})$ and increase the Raman gain efficiency $(g_R/A_{eff,R})$.

Respective relationships between the chromatic dispersion values to the effective area $A_{eff,p}$ of the pumping light and the effective area $A_{eff,s}$ of the signal light are expected to change depending on differences in the refractive index profile and the core composition. However, freedom in the refractive index profile and the core composition is restricted when realizing at low cost an optical fiber for Raman amplification that has a Raman gain efficiency of 5 $(W \times km)^{-1}$ or more with the pumping light of 1,450 nm. Therefore, in the case of realizing the optical fiber for Raman amplification according to the present invention, the respective relationships are not substantially different from the results shown in FIG. 2.

Optical fibers for Raman amplification 101 to 107 are practical examples of the optical fiber for Raman amplification described above. Optical fibers for Raman amplification 401 to 403 are practical examples of optical fibers for Raman amplification. Respective relationships between the chromatic dispersion values to Raman gain efficiencies $(g_R/A_{eff,R})$ and nonlinear coefficients $(n_2/A_{eff,s})$ based on actual measurements of various parameters, are described below.

The optical fibers for Raman amplification 101 to 107 and 401 to 403 have the refractive index profile shown in FIG. 1, and the same core composition where $\Delta 1 = 2.8\%$, $\Delta 2 = -0.23\%$, Ra=0.45, and $\Delta$clad=0%.

The measurements of the various parameters of the optical fibers for Raman amplification 101 to 107 and 401 to 403 are shown in a table of FIG. 3. The optical fibers for Raman amplification 101 to 107 and 401 to 403 have different second core diameters b. Therefore, the measurements of the other parameters, such as the dispersion values, are changed. Among the parameters shown in FIG. 3, the chromatic dispersion value, the dispersion slope, the nonlinear coefficient $(n_2/A_{eff,s})$ and the bending loss when the optical fiber is wound at the diameter of 20 mm, are measured at the wavelength of 1,550 nm. In FIG. 3, "-" means that the parameter is not within a measurable range. Thus, the results say that the zero-dispersion wavelength $\lambda_0$ is not in a range of from 1,300 nm to 1,700 nm, and that the bending loss at $\phi$20 mm is 0.1 dB/m or less at the wavelength of 1,550 nm.

In the optical fibers for Raman amplification 101 to 107 shown in FIG. 3, the chromatic dispersion value is from $-70$ ps/nm/km to $-30$ ps/nm/km at the wavelength of 1,550 nm, the absolute value of the dispersion slope is 0.05 ps/nm²/km or less at the wavelength of 1,550 nm, the Raman gain efficiency is 5 $(W \cdot km)^{-1}$ or more with the pumping light at the wavelength of 1,450 nm, the nonlinear coefficient $(n_2/A_{eff,s})$ is $5.0 \times 10^{-9}$ $W^{-1}$ or less at the wavelength of 1,550 nm, the zero-dispersion wavelength $\lambda_0$ is neither at the signal light wavelength from S band to U band nor the corresponding Raman pumping light wavelength, where is from 1,350 nm to 1,675 nm, the cut-off wavelength $\lambda_c$ is equal to or less than 1,350 nm that is the minimum Raman pumping light wavelength corresponding to the S band signal light, and the bending loss at $\phi$20 mm is 0.1 dB/m or less at the wavelength of 1,550 nm. In the optical fibers for Raman amplification 104 to 107 and 401, the diameter of the glass part is 100 $\mu$m or less, and the outer diameter of the coating is 150 $\mu$m or less.

As shown in FIG. 3, the optical fibers for Raman amplification 101 and 403 have the same nonlinear coefficient $(n_2/A_{eff,s})$, but the Raman gain coefficient $g_R/A_{eff,R}$ is higher by 13% for the optical fiber for Raman amplification 101. The optical fibers for Raman amplification 102 to 104 and 401 have the same nonlinear coefficient $(n_2/A_{eff,s})$, but the Raman gain coefficients $g_R/A_{eff,R}$ are higher by about 5% for the optical fibers for Raman amplification 102 to 104. Compared with the optical fibers for Raman amplification 402, 403, the optical fibers for Raman amplification 105 to 107 have nonlinear coefficients $(n_2/A_{eff,s})$ that are higher by about 7%, but have Raman gain coefficients $(g_R/A_{eff,R})$ that are higher by 20% or more.

Figure 4:
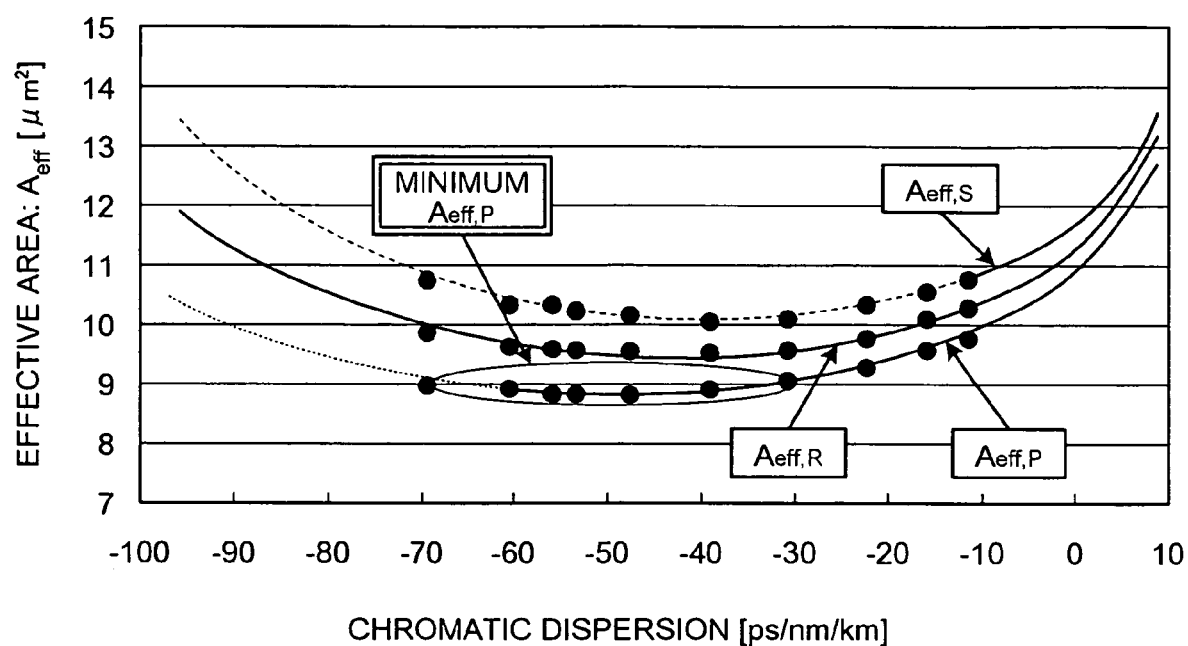
FIG. 4 is a graph of the correlation between chromatic dispersion and effective area of the optical fiber for Raman amplification according to the present invention based on an actual measurement.

FIG. 4 is a graph of measurement results for the optical fibers for Raman amplification 101 to 107 and 401 to 403, and results calculated from electric field distributions of light in the optical fiber for Raman amplification. Points in the graph represent measured values, and curves represent calculated values. The chromatic dispersion values [ps/nm/km] of the optical fiber for Raman amplification at the wavelength of 1,550 nm are plotted on the horizontal axis. The effective area $A_{eff,S}$ [μM$^2$] at the signal light wavelength of 1,550 nm, the effective area $A_{eff,P}$ [μm$^2$] at the pumping light wavelength of 1,450 nm, and the Raman effective area $A_{eff,R}$ at the signal light wavelength of 1,550 nm and at the pumping light wavelength of 1,450 nm are plotted on the vertical axis. The Raman effective area $A_{eff,R}$ of measured values cannot be obtained directly from Equation (4). It is thus obtained by substituting in Equation (5) measured effective areas $A_{eff,S}$ of the signal light and measured effective areas $A_{eff,P}$ of the pumping light, for each of the chromatic dispersion values. Moreover, the calculated Raman effective area $A_{eff,R}$ is obtained by using Equation (4), in the same manner as the example in FIG. 2.

As shown in FIG. 4, the measured values are substantially equal to the calculated values. Thus, in the optical fiber for Raman amplification, the effective area $A_{eff,P}$ of the pumping light at the wavelength of 1,450 nm is minimized, when the chromatic dispersion value is from −70 ps/nm/km to −30 ps/nm/km at the wavelength of 1,550 nm.

The optimal chromatic dispersion value range of −70 ps/nm/km to −30 ps/nm/km is expected to change, depending on differences in the refractive index profile and core composition. However, freedom in the refractive index profile and core composition is restricted when realizing at low cost an optical fiber for Raman amplification that has a Raman gain efficiency of 5 (W×km)$^{-1}$ or more with the pumping light of 1450 nm. As a result, in the case of realizing the optical fiber for Raman amplification according to the present invention, the chromatic dispersion value range does not change much. Therefore, the optimal chromatic dispersion value range of −70 ps/nm/km to −30 ps/nm/km is effective even if the refractive index profile is different from that of the embodiment.

Based on the first study, the optical fibers for Raman amplification 101 to 107 are able to increase the Raman gain efficiency ($g_R/A_{eff,R}$) while suppressing the nonlinear coefficient ($n_2/A_{eff,S}$). This is because the chromatic dispersion values range from −70 ps/nm/km to −30 ps/nm/km at the wavelength of 1,550 nm.

Optical fibers for Raman amplification 201 to 203 and 301 to 303 are practical examples of the optical fiber for Raman amplification described above. Optical fibers for Raman amplification 501, 502, 601, and 602 are practical examples of optical fibers for Raman amplification. Respective relationships between the chromatic dispersion values to the Raman gain efficiencies ($g_R/A_{eff,R}$) and the nonlinear coefficients ($n_2/A_{eff,S}$) based on actual measurements of various parameters, are described below.

The optical fibers for Raman amplification 201 to 203, 501, 502, 301 to 303, 601 and 602 have the refractive index profile shown in FIG. 1. The optical fibers for Raman amplification 201 to 203, 501, and 502 have the same core composition where Δ1=2.2%, Δ2=−0.55%, Ra=0.33, and Δclad=0%. The optical fibers for Raman amplification 301 to 303, 601 and 602 have the same core composition as the optical fibers for Raman amplification 201 to 203, 501, and 502, except that Δclad=−0.26%. Therefore, Δ1=2.5%, Δ2=−0.29%, Ra=0.33, and Δclad=−0.26%. In the optical fibers for Raman amplification 301 to 303, 601 and 602, F is doped in the cladding to make the Δclad negative.

The measurements of the various parameters of the optical fibers for Raman amplification 201 to 203, 501, 502, 301 to 303, 601 and 602 are shown in the table of FIG. 5. The optical fibers for Raman amplification 201 to 203, 501, 502, 301 to 303, 601 and 602 have different second core diameters b. Therefore, the measurements of the other parameters, such as the dispersion values, are changed. Among the parameters shown in FIG. 5, the chromatic dispersion value, the dispersion slope, the nonlinear coefficient ($n_2/A_{eff,S}$) and the bending loss at φ20 mm, are measured at the wavelength of 1,550 nm. In FIG. 5, "−" means that the parameter is not within a measurement range. Thus, the results say that the zero-dispersion wavelength $\lambda_0$ is not in a range of from 1,300 nm to 1,700 nm, and that the bending loss at φ20 mm is 0.1 dB/m or less at the wavelength of 1,550 nm.

In the optical fibers for Raman amplification 201 to 203 and 301 to 303 shown in FIG. 5, the chromatic dispersion value is from −70 ps/nm/km to −30 ps/nm/km at the wavelength of 1,550 nm, the absolute value of the dispersion slope is 0.05 ps/nm$^2$/km or less at the wavelength of 1,550 nm, the Raman gain efficiency is 5 (W·km)$^{-1}$ or more with the pumping light at the wavelength of 1,450 nm, the nonlinear coefficient ($n_2/A_{eff,S}$) is 5.0×10$^{-9}$ W$^{-1}$ or less at the wavelength of 1,550 nm, the zero-dispersion wavelength $\lambda_0$ is neither at the signal light wavelength from S band to U band nor at the corresponding Raman pumping light wavelength, in which is from 1,350-nm to 1,675 nm, the cut-off wavelength $\lambda_c$ is equal to or less than 1,350 nm that is the minimum Raman pumping light wavelength corresponding to the S band signal light, the bending loss at φ20 mm is 0.1 dB/m or less at the wavelength of 1,550 nm, the outer diameter of the glass part is 100 μm or less and the outer diameter of the coating is 150 μm or less.

As shown in FIG. 5, the optical fibers for Raman amplification 201 and 501 have the same nonlinear coefficient ($n_2/A_{eff,S}$), but the Raman gain efficiency ($g_R/A_{eff,R}$) is higher by about 4% for the optical fiber for Raman amplification 201. The optical fibers for Raman amplification 302, 303 and 601 have the same nonlinear coefficient ($n_2/A_{eff,S}$), but the Raman gain efficiencies ($g_R/A_{eff,R}$) are higher by 2% or more for the optical fibers for Raman amplification 302, 303. Compared with the optical fiber for Raman amplification 502, the optical fibers for Raman amplification 202, 203 have the nonlinear coefficients ($n_2/A_{eff,S}$) that are higher by about 6%, but have Raman gain efficiencies ($g_R/A_{eff,R}$) that are higher by larger margins, i.e. 13% or more. Likewise, compared with the optical fiber for Raman amplification 602, the optical fiber for Raman amplification 301 has a nonlinear coefficient ($n_2/A_{eff,S}$) that is higher by about 3%, but has a Raman gain efficiency ($g_R/A_{eff,R}$) that is higher by a larger margin, i.e. about 12%.

Based on the above study, the optical fibers for Raman amplification 201 to 203 and 301 to 303 are able to increase the Raman gain efficiency ($g_R/A_{eff,R}$) while suppressing the nonlinear coefficient ($n_2/A_{eff,S}$). This is because the chromatic dispersion values range from −70 ps/nm/km to −30 ps/nm/km at the wavelength of 1,550 nm.

The optical fibers for Raman amplification 201 to 203 and 301 to 303 have the same core but are different in Δclad. As shown in FIG. 5, the optical fibers for Raman amplification that have the similar chromatic dispersion values at the wavelength of 1,550 nm were compared. As a result, compared to the optical fibers for Raman amplification 201 to 203, for the optical fibers for Raman amplification 301 to 303, absolute values of the dispersion slope at the wavelength of 1,550 nm, $A_{eff,R}$, $A_{eff,P}$, $A_{eff,S}$, and nonlinear coefficients ($n_2/A_{eff,S}$) are smaller, Raman gain efficiencies ($g_R/A_{eff,R}$) are larger, and cut-off wavelengths $\lambda_c$ are longer. For an optical fiber for Raman amplification, the cut-off wavelength $\lambda_c$ is to be shorter than the minimum pumping light wavelength, and it is preferable that the absolute value of the dispersion slope, $A_{eff,R}$, $A_{eff,p}$, $A_{eff,s}$, and the nonlinear coefficient ($n_2/A_{eff,s}$) are small, and the Raman gain efficiency ($g_R/A_{eff,R}$) is large. The optical fibers for Raman amplification 301 to 303 have the cut-off wavelengths $\lambda_c$ that are sufficiently shorter than the minimum pumping light wavelength corresponding to the signal light in the S band, and are therefore more preferable than the optical fibers for Raman amplification 201 to 203. Accordingly, a negative Δclad is more preferable for an optical fiber for Raman amplification. Moreover, characteristics of the optical fiber for Raman amplification are improved when the Δclad is −0.15% or less, and the manufacturing is facilitated when the Δclad is −0.70% or more.

Figure 6:
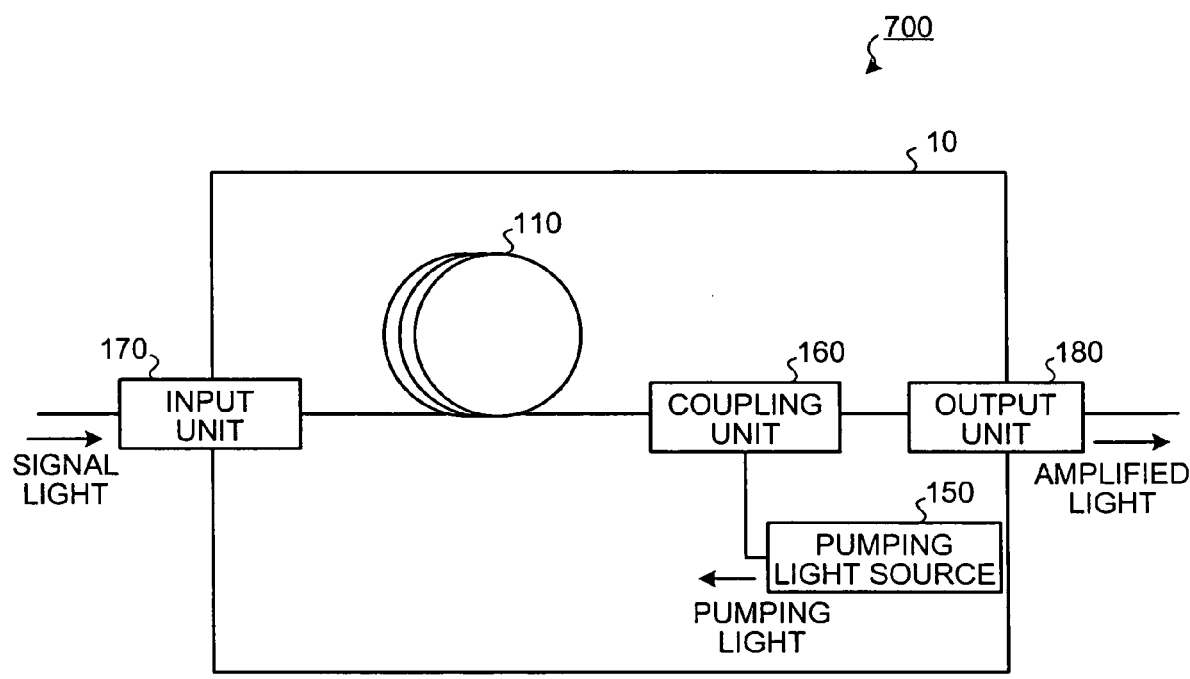
FIG. 6 is a schematic of an optical communication system according to the present invention.

FIG. 6 is a schematic of the optical communication system 700 according to the present invention. The optical communication system 700 includes a Raman amplifier 10 as an optical amplifier. The Raman amplifier 10 includes an optical fiber coil 110, a pumping light source 150, and a coupling unit 160. The optical fiber coil 110 is formed by winding the optical fiber for Raman amplification (the optical fibers for Raman amplification 101 to 107, 201 to 203, 301 to 303 according to the embodiment of the present invention are applied) around a bobbin. The pumping light source 150 outputs a pumping light used for Raman amplification. The coupling unit 160 supplies the pumping light to the optical fiber coil 110.

Moreover, as shown in FIG. 6, the optical communication system 700 includes an input unit 170 that receives a signal light, and an output unit 180 that outputs a Raman-amplified signal light (amplified light). The Raman amplifier 10 includes optical components such as an isolator and a WDM coupler (not shown). In the configuration of FIG. 6, the pumping light is input from the opposite direction of the signal light (backward pumping). However, the pumping light can be input from the same direction of the signal light (forward pumping). Alternatively, both backward pumping and forward pumping can be applied.

In the optical communication system 700 employing the Raman amplifier 10, the pumping light used for Raman amplification is supplied to the optical fiber coil 110 via the coupling unit 160. The signal light input from the input unit 170 is propagated through the optical fiber coil 110, and Raman amplified by the pumping light, and output from the output unit 180 as amplified light.

The pumping light source 150 includes a laser device (not shown) that has a wavelength of from 1,350 nm to 1,580 nm and output power of 10 mW or more, to amplify a signal light in a wavelength from S band to U band. The wavelength and waveform of a laser used in the pumping light source 150 can be changed depending on a purpose of the Raman amplifier 10. Efficiency of the Raman amplification depends on polarization state of the pumping light. Therefore, the pumping light is depolarized before being supplied to the optical fiber coil via the coupling unit 160, so as not to affect the efficiency of the Raman amplification.

Because the Raman amplifier 10 employs the optical fiber for Raman amplification, efficiency of Raman amplification is high, distortion of waveforms of signal lights caused by nonlinear optical phenomena is suppressed, and the Raman amplifier 10 can be used in a wide band.

Next, a practical embodiment of the optical communication system 700 is described below. It is assumed that in the optical fiber coil 110, 2 km of the optical fiber for Raman amplification 105 (see parameters of FIG. 3) is employed as the optical fiber for Raman amplification, and is wound around a bobbin with an inner diameter of 45 mm.

Figure 7:
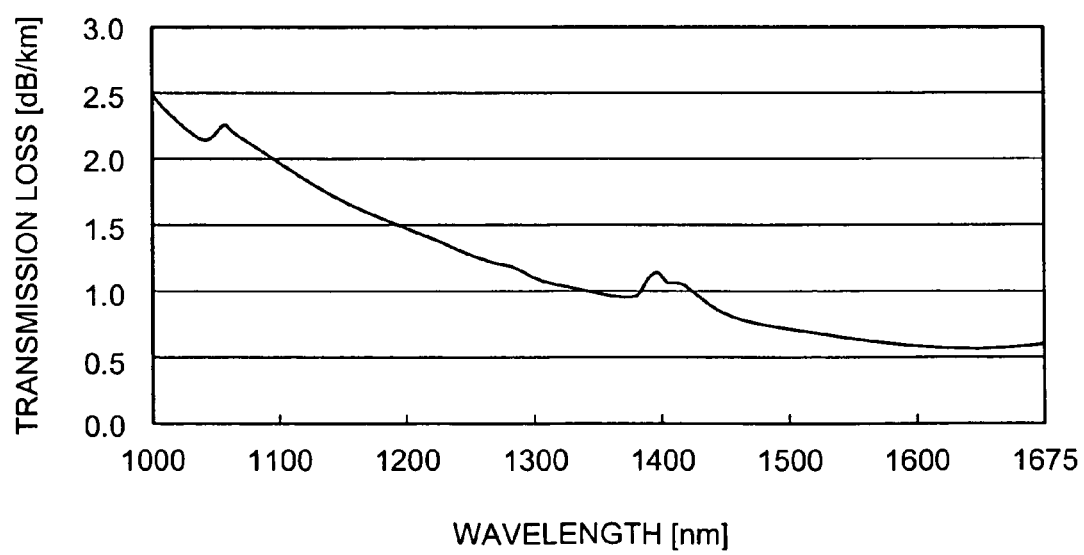
FIG. 7 is a graph of wavelength-dependent transmission loss of an optical fiber coil shown in FIG. 6.

FIG. 7 is a graph of wavelength-dependent transmission loss of the optical fiber for Raman amplification 105 in the optical fiber coil 110. Signal light wavelength [nm] is plotted on the horizontal axis, and transmission loss [dB/km] is plotted on the vertical axis. The transmission losses at signal light wavelengths of 1,460 nm, 1,530 nm, 1,600 nm and 1,670 nm are 0.76 dB/km, 0.65 dB/km, 0.60 dB/km, and 0.63 dB/km, respectively.

Typically, when an optical fiber is wound around a bobbin with a small inner diameter, the transmission loss is apt to increase in a long wavelength region (approximately 1,500 nm or more). The optical fiber for Raman amplification 105 is wound around the bobbin with the inner diameter of 45 mm, but the transmission loss does not increase in the long wavelength region, as shown in FIG. 7. This is because the bending loss at φ20 mm of the optical fiber for Raman amplification 105 is 0.1 dB/m or less at the signal light wavelength of 1,550 nm.

An outer diameter of the coating is 142 μm for the optical fiber for Raman amplification 105, while an outer diameter of the coating is about 250 μm for typical optical fibers for Raman amplification. Therefore, the volume of the optical fiber for Raman amplification 105 is about 30% of that of a typical optical fiber for Raman amplification, when the lengths are the same. Accordingly, the optical fiber coil 110 is reduced in size by using the optical fiber for Raman amplification 105 in which the outer diameter of the coating is 150 μm or less, as compared to the case of using other optical fibers for Raman amplification in which the outer diameter of the coating is about 250 μm.

The outer diameter of the glass part is 125 μm for typical optical fibers for Raman amplification. If such an optical fiber for Raman amplification is wound around a bobbin with an inner diameter of less than 60 mm, reliability decreases due to bending stress on the optical fiber for Raman amplification. However, the outer diameter of the glass part is 100 μm or less for the optical fiber for Raman amplification 105, so the bending stress is suppressed even when wound around a bobbin with an inner diameter 45 mm. Therefore, the optical fiber coil 110 can be formed without decreasing the reliability.

Typical single-mode optical fibers that have zero-dispersion wavelengths in 1.3-micrometer band can be connected at both ends of the optical fiber coil 110. In this case, the optical fiber coil 110 can be easily connected to the optical components such as an isolator or a WDM coupler. For example, when the typical single-mode optical fibers that have zero-dispersion wavelengths in 1.3-micrometer band are connected at both ends of the optical fiber coil 110, the splice loss at one end is 0.1 dB.

Figures 8, 9:
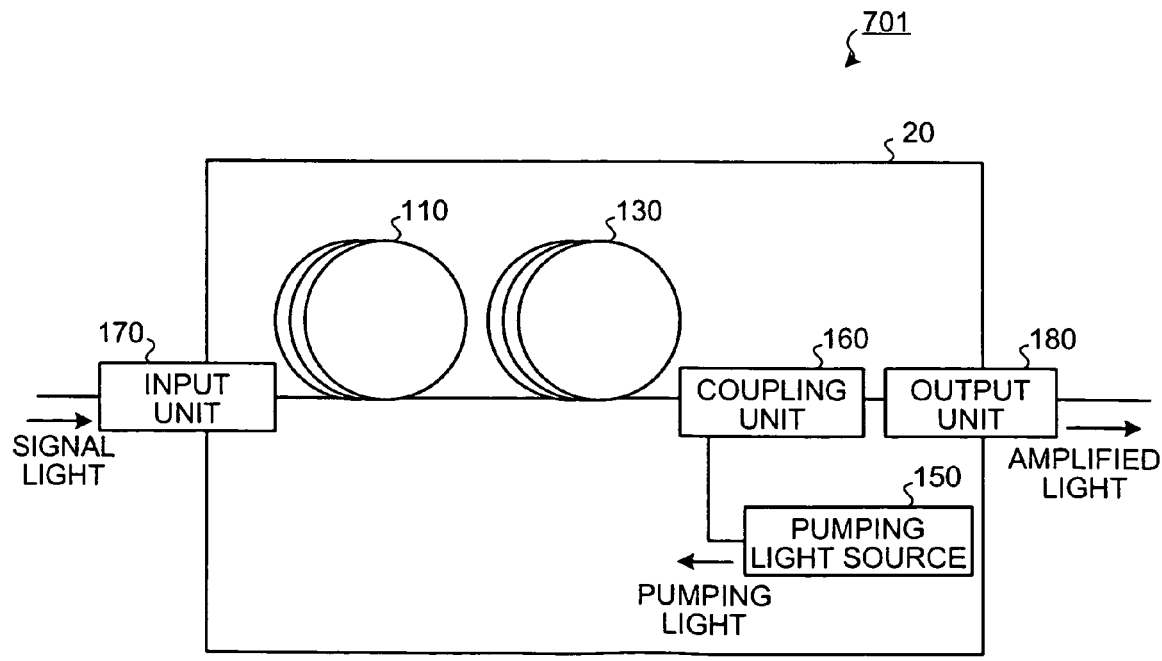
FIG. 8 is a table of simulation results of power conversion efficiency and nonlinear phase shift of the optical communication system according to the present invention.
FIG. 9 is a schematic of an example of a modification of the optical communication system according to the present invention.

Next, results of a numerical simulation for the optical communication system 700 are described below. The signal light input from the input unit 170 has wavelength (channel) intervals of 50 GHz. When the wavelength is in C band, L band and C+L band (1,530 nm to 1,600 nm), input power of the signal light input from the input unit 170 is 0 dB per channel (dB/ch), and output power of the amplified light output from the output unit 180 is 9 dB per channel. FIG. 8 is a table showing the number of channels of the signal light, the pumping light wavelength output from the pumping light source 150, the pumping light power supplied to the optical fiber coil 110 via the coupling unit 160, the power conversion efficiency of the Raman amplifier 10, and the nonlinear phase shift of the signal lights in the Raman amplifier 10, in each of the bands.

The power conversion efficiency of the Raman amplifier 10 is a ratio [%] of [(sum of output power of amplified lights output from the output unit 180)−(sum of input power of signal lights input from the input unit 170)] to (sum of pumping power supplied to the optical fiber coil 110 from the coupling unit 160). However, the numerical simulation only considers the transmission loss of the optical fiber for Raman amplification 105. Therefore, the transmission losses of the coupling unit 160, the typical single-mode optical fibers, the optical components such as an isolator, and the splice loss between the optical fiber for Raman amplification 105 and the typical single-mode optical fiber are not considered.

As shown in the table of FIG. 8, in the Raman amplifier 10, the power conversion efficiency is high, and the nonlinear phase shift of the signal lights is small. In the optical fiber for Raman amplification 105, the chromatic dispersion values at signal light wavelengths of 1,460 nm, 1,530 nm, 1,600 nm and 1,670 nm are −47.1 ps/nm/km, −47.3 ps/nm/km, −47.6 ps/nm/km, and −47.9 ps/nm/km, respectively. Therefore, in the Raman amplifier 10, the amplification efficiency for the signal light wavelength from S band to U band is high. As a result, distortion of waveforms of signal lights caused by nonlinear optical phenomena is suppressed, and the Raman amplifier 10 can be used in a wide wavelength region.

An optical communication system 701 shown in FIG. 9 can be used instead of the optical communication system 700. The optical communication system 701 is a modification of the optical communication system according to the embodiment of the present invention, and is configured by adding an optical fiber coil, formed by winding a dispersion compensating optical fiber (DCF) around a bobbin, to the optical communication system 700. FIG. 9 is a schematic of the optical communication system 701. As shown in FIG. 9, the optical communication system 701 includes a Raman amplifier 20 as an optical amplifier, instead of the Raman amplifier 10. The Raman amplifier 20 has the same configuration as that of the Raman amplifier 10, except that an optical fiber coil 130 is added between the optical fiber coil 110 and the coupling unit 160. The optical fiber coil 130 can alternatively be added between the input unit 170 and the optical fiber coil 110.

The optical fiber coil 130 is formed by winding the DCF around a bobbin. Pumping light used for Raman amplification is output from the pumping light source 150 and supplied to two optical fiber coils 110 and 130 via the coupling unit 160.

In FIG. 9, the input unit 170 of a signal light and the output unit 180 that outputs a Raman-amplified signal light (amplified light) are shown, however, optical parts such as an isolator and a WDM coupler included in the Raman amplifier 20 are not shown. In this configuration, the pumping light is input from the direction opposite to the signal light (backward pumping). However, the Raman amplifier 20 can be configured so that the pumping light is input from the same direction as the signal light (forward pumping), or to perform both backward pumping and forward pumping.

In the optical communication system 701 employing the Raman amplifier 20, the pumping light used for Raman amplification is supplied to the optical fiber coil 110, 130 via the coupling unit 160. The signal light input from the input unit 170 is propagated through the optical fiber coil 110, 130, and Raman amplified by the pumping light, and output from the output unit 180 as amplified light. Because the Raman amplifier 20 employs the DCF, it is possible to compensate for a chromatic dispersion of a transmission channel optical fiber in a wide band region.

Because the Raman amplifier 20 employs the optical fiber for Raman amplification, efficiency of Raman amplification is high, distortion of waveforms of signal lights caused by nonlinear optical phenomena is suppressed, and the Raman amplifier 20 can be used in a wide band. Moreover, it is possible to compensate for a chromatic dispersion of a transmission optical fiber in a wide wavelength region.

As described above, in the optical fiber for Raman amplification, a pumping light is supplied to Raman amplify a signal light, the chromatic dispersion value is from −70 ps/nm/km to −30 ps/nm/km at the wavelength of 1,550 nm, the Raman gain efficiency is 5 (W·km)$^{-1}$ or more with the pumping light of 1,450 nm, the nonlinear coefficient is $5.0 \times 10^{-9}$ W$^{-1}$ or less at the wavelength of 1,550 nm, the zero-dispersion wavelength is not at the signal light wavelength nor at the pumping light wavelength, and the cut-off wavelength $\lambda_c$ is equal to or less than the pumping light wavelength. Therefore, the optical fiber for Raman amplification, the optical fiber coil 110 including the optical fiber for Raman amplification, the Raman amplifiers 10, 20 including the optical fiber for Raman amplification, and the optical communication systems 700, 701 including the Raman amplifiers 10, 20 increase the Raman gain efficiency while suppressing the nonlinear coefficient.

Figure 10:
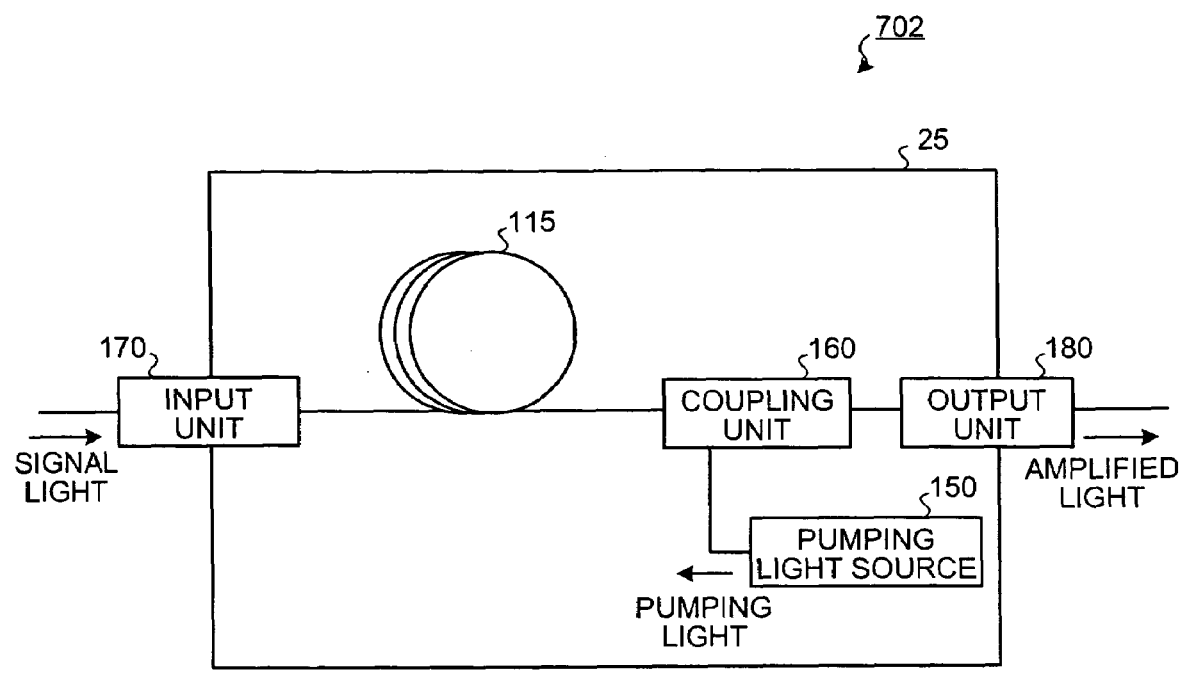
FIG. 10 is a schematic of another example of a modification of the optical communication system according to the present invention.

FIG. 10 is a schematic of a second modification of the optical communication system according to the present invention. As shown in FIG. 10, an optical communication system 702 includes a Raman amplifier 25 instead of the Raman amplifier 10 in the optical communication system 700 shown in FIG. 6. The Raman amplifier 25 includes an optical fiber coil 115 instead of the optical fiber coil 110 in the above-mentioned Raman amplifier 10. Other components are the same as those of the optical communication system 700, and common components are denoted by the same reference numerals.

The optical communication system 702 includes the Raman amplifier 25 in which signal light input from the input unit 170 is Raman amplified, and output from the output unit 180. The characteristic of the optical communication system 702 is that the signal light is propagated and Raman amplified by the Raman amplifier 25. The Raman amplifier 25 includes the optical fiber for Raman amplification in at least one part between the input unit 170 and the output unit 180, and the pumping light source 150 that outputs a pumping light used for Raman amplification to the optical fiber for Raman amplification. The optical fiber for Raman amplification satisfies all the characteristics described below. In this case, similarly to the optical fiber for Raman amplification described above, the optical fiber for Raman amplification is wound around a bobbin, and provided in the Raman amplifier 25 as the optical fiber coil 115.

A chromatic dispersion value at a signal light wavelength is −7.39×Pout/S[ps/nm/km] or less, where signal power at an output end of the amplifying fiber is Pout[mW/ch] and an wavelength interval between adjacent WDM signals is S[nm].

Raman gain efficiency is 5 [(W×km)$^{-1}$] or more with a pumping light of 1,450 nm.

A zero-dispersion wavelength $\lambda_0$ is neither at a wavelength of the signal light nor at a wavelength of the pumping light.

A cut-off wavelength $\lambda_c$ is equal to or less than the pumping light wavelength.

The optical fiber for Raman amplification is able to suppress distortion of signal light waveforms caused by nonlinear optical phenomenon, because the chromatic dispersion value at the signal light wavelength is set as described above. Furthermore, the optical fiber for Raman amplification is able to perform Raman amplification on signal lights in a highly efficient manner, because the Raman gain efficiency with a pumping light of 1,450 nm is set as described above. Moreover, distortion of signal light waveforms and pumping light waveforms caused by four-wave mixing is suppressed, because the zero-dispersion wavelength $\lambda_0$ is not at the signal light wavelength nor the pumping light wavelength as described above. Further, because the cut-off wavelength $\lambda_c$ is set equal to or below the pumping light wavelength as described above, the pumping light energy is effectively used.

As shown in FIG. 10, the optical communication system 702 is configured to perform backward pumping. However, similarly to the optical communication system 700, 701, forward pumping, or both backward pumping and forward pumping can be performed. Moreover, similarly to the optical communication system 701, the optical communication system 702 can further include the optical fiber coil 130. In this case, the optical fiber coil 130 can be provided between the optical fiber coil 115 and the coupling unit 160, or between the input unit 170 and the optical fiber coil 115.

Actual measurements of various parameters of optical fibers for Raman amplification 801 to 809 (practical examples corresponding to the optical fiber for Raman amplification described above) are shown in FIG. 11. In FIG. 11, the optical fibers for Raman amplification 801 to 809 have the refractive index profile shown in FIG. 1, and the same core composition where $\Delta 1=2.8\%$, $\Delta 2=-0.17\%$, Ra=0.48, and $\Delta$clad=0%.

The optical fibers for Raman amplification 801 to 809 have different second core diameters b. Therefore, the measurements of the other parameters, such as the dispersion values, are changed. Among the parameters shown in FIG. 11, the chromatic dispersion value, the dispersion slope, the nonlinear coefficient ($n_2/A_{eff,s}$) and the bending loss when the optical fiber is wound at the diameter of 20 mm, are measured at the wavelength of 1,550 nm. In FIG. 11, "-" means that the parameter is not within a measurement range. Thus, the results say that the zero-dispersion wavelength $\lambda_0$ is not in a range of from 1,300 nm to 1,700 nm, and that the bending loss at $\phi$20 mm is 0.1 dB/m or less at the wavelength of 1,550 nm.

In the optical fibers for Raman amplification 801 to 809 shown in FIG. 11, the chromatic dispersion value is −20 ps/nm/km or less at the wavelength of 1,550 nm, the absolute value of the dispersion slope is 0.05 ps/nm²/km or less at the wavelength of 1,550 nm, the Raman gain efficiency is 5 (W·km)$^{-1}$ or more with the pumping light of 1,450 nm, the zero-dispersion wavelength $\lambda_0$ is not at the signal light wavelength from S band to U band nor the corresponding Raman pumping light wavelength, where is from 1,350 nm to 1,675 nm, the cut-off wavelength $\lambda_c$ is equal to or less than 1,350 nm that is the minimum Raman pumping light wavelength corresponding to the S band signal light, and the bending loss at $\phi$20 mm is 0.1 dB/m or less at the wavelength of 1,550 nm. In the optical fibers for Raman amplification 801 to 809, the diameter of the glass part is 100 μm or less, and the outer diameter of the coating is 150 μm or less.

Figure 12:
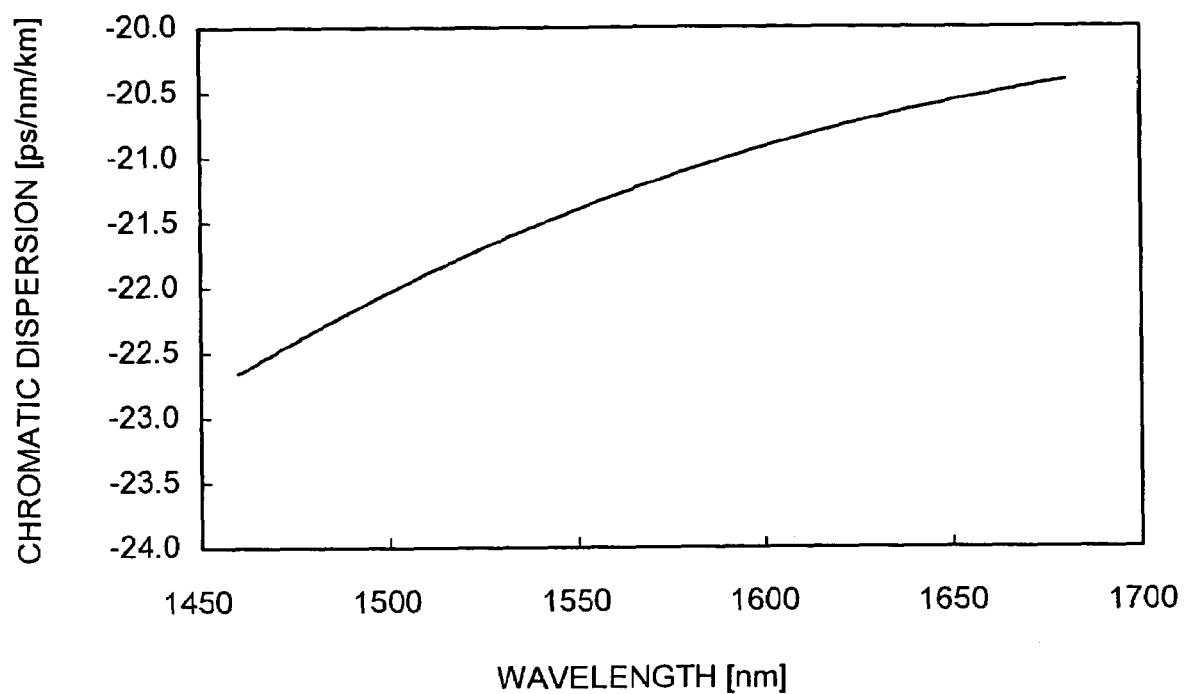
FIG. 12 is a graph of wavelength-dependent dispersion of the optical fibers for Raman amplification shown in FIG. 11.

FIG. 12 depicts a wavelength dependence of a chromatic dispersion of the optical fiber for Raman amplification 809. The optical fiber for Raman amplification 809 has the smallest chromatic dispersion value among the optical fibers for Raman amplification 801 to 809. In FIG. 12, the horizontal axis represents optical wavelength [nm], and the vertical axis represents the chromatic dispersion value at each wavelength [ps/nm/km]. At wavelengths 1,460 nm, 1,530 nm, 1,550 nm, 1,565 nm, 1,625 nm, 1,675 nm, the chromatic dispersion values are −22.7 ps/nm/km, −21.6 ps/nm/km, −21.4 ps/nm/km, −21.2 ps/nm/km, −20.7 ps/nm/km, −20.4 ps/nm/km, respectively.

Even when an optimal chromatic dispersion value at a wavelength of 1,550 nm is set, if the chromatic dispersion has a large slope, a chromatic dispersion value in a wavelength other than 1,550 nm deviates from an optimal value. In the optical fiber for Raman amplification 809, the absolute value of a dispersion slope at a wavelength of 1,550 nm is less than 0.05 ps/nm²/km. Therefore, the fluctuation of the chromatic dispersion value in a wide band is small, and an optimal value is realized in a wide wavelength range from 1,460 nm to 1,675 nm inclusive.

Figure 13:
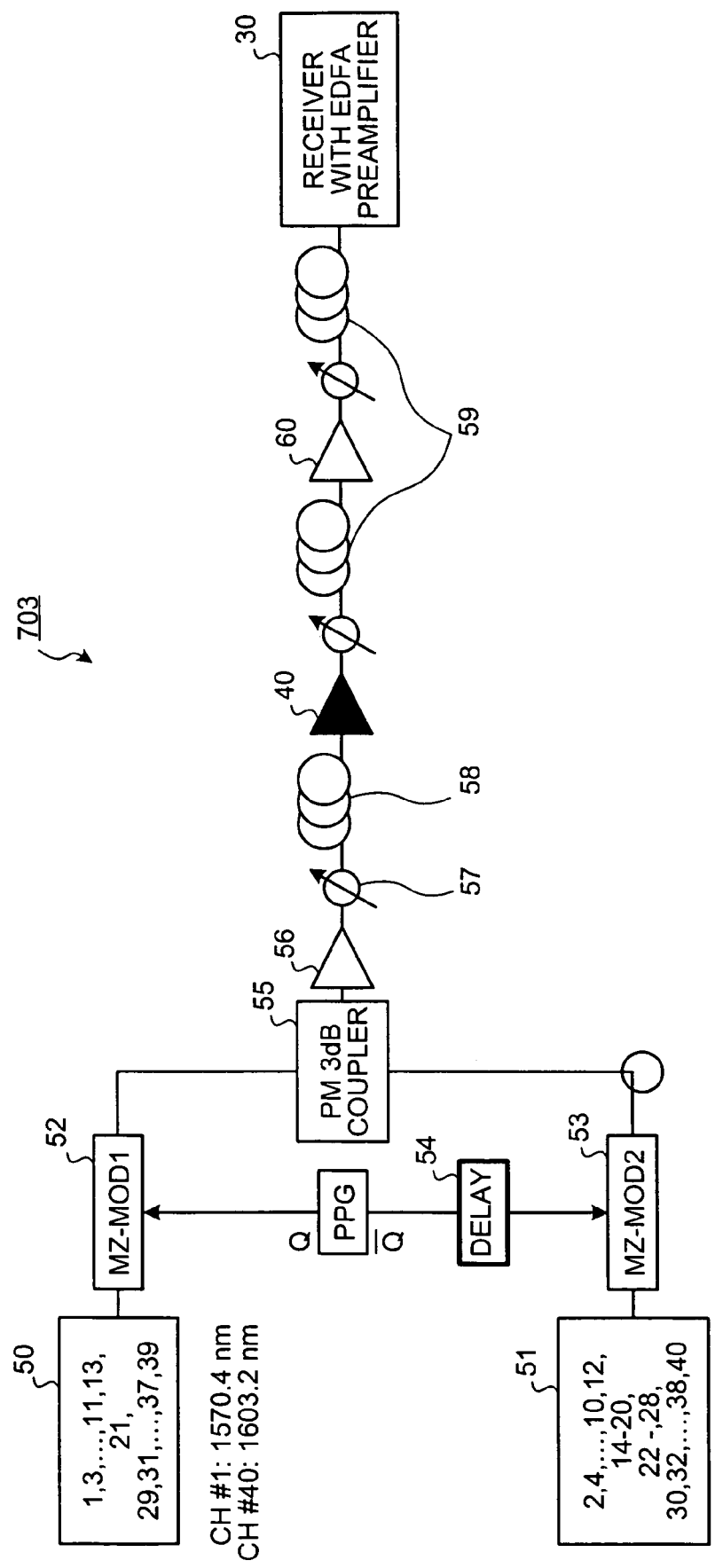
FIG. 13 is a schematic of an example of a WDM transmission experiment system for evaluating an -effect of XPM.

FIG. 13 is a block diagram of an example of a WDM transmission system for evaluating the effect of the XPM of an optical communication system according to the present invention. As shown in FIG. 13, a WDM system 703 includes a Raman amplifier 40 (that is, a Raman amplifier having a similar configuration to any one of the Raman amplifiers 10, 20, 25 described above). The WDM system 703 is used for evaluating degradation of system characteristics of the Raman amplifier 40 caused by nonlinear effects, particularly degradation caused by XPM. In this case, the WDM system 703 includes the optical communication system provided with the Raman amplifier 40, that is the optical communication system according to the present invention (for example the optical communication system 700 to 702). The WDM system 703 uses the Raman amplifier 40 to evaluate degradation of system characteristics, to thereby evaluate degradation of system characteristics of the optical communication system according to the present invention (particularly degradation of system characteristics caused by XPM). In this example, 40 channels of WDM signals between wavelength bands 1,570.4 nm to 1,603.2 nm are provided with intervals of 100 GHz, and the system characteristics of the 21st channel (wavelength 1,587.0 nm) positioned in the middle of the signal band are evaluated.

WDM light sources 50, 51 shown in FIG. 13 are realized connecting to 40 channels of continuous wave (CW) lasers and a wavelength coupler. The WDM light sources 50, 51 output optical signals by appropriately selecting necessary channels. Basically, the WDM light sources 50, 51 separately couple wavelengths of odd-number channels and even-number channels, a modulator 52 modulates intensity of signal lights of odd-number channels, and a modulator 53 modulates intensity of signal lights of even-number channels. However, according to a basic study conducted by the inventor, degradation in system characteristics of the 21$^{st}$ channel that is the evaluation object, is more significant when the 15th, 17th, 19th, 23rd, 25th, and 27th channels, which are located near the 21st channel, passed through the modulator 53 on the side of even-number channels, than when passed through the modulator 52 on the side of the odd-number channels that includes the 21st channel. Thus, these 6 odd-number channels are selected from the WDM light source 51, and are exceptionally passed through the modulator 53 on the side of even-number channels.

Electric signals sent to two modulators 52, 53 are in a pseudorandom bit sequence (PRBS) of a pattern length of $2^{31}-1$ and in a cycle of 10.664 Gb/s, and in the modulation format of non-return to zero (NRZ). Data with inverted bits is sent to the two modulators 52, 53, a variable delay line 54 is inserted in a signal line on the side of the even-number channels, so that the correlation of bit slots of optical signals output from the two modulators 52, 53 can be adjusted.

Further, to make these bit patterns uncorrelated with each other, the respective lengths of fibers between a polarization maintaining 3 dB coupler 55, which couples both optical signals, to the modulators 52 and the modulators 53 differ by roughly 2 m. The polarization maintaining 3 dB coupler 55 is used to effectively generate a nonlinear interaction between WDM channels.

The 40 channels of WDM signals are collected together by the 3 dB coupler 55, amplified by a booster EDFA 56, and then sequentially passed through a variable optical attenuator (VOA) 57 and a standard single-mode fiber (SMF) 58 to be input in the Raman amplifier 40. The input signal power to the Raman amplifier 40 is adjusted by the VOA 57. A length of the SMF 58 disposed immediately before the Raman amplifier 40 is adjusted so as to cancel an accumulated chromatic dispersion in an optical fiber for Raman amplification 41. The optical fiber for Raman amplification 41 has the same characteristics as either one of the optical fibers for Raman amplification according to the present invention, and is an amplifying medium of the Raman amplifier 40. By setting this configuration, the WDM signals output from the modulators 52, 53 are temporally synchronized on the amplifier output side where the optical signal power is maximized in the optical fiber for Raman amplification 41. In other words, the channels adjacent near the 21st channel (from the 14th to the 20th channels and also from the 22nd to the 28th channels) switch between 0 and 1 at the same timing. As a result, the XPM received by the 21st channel is such as the sum of a nonlinear effect from these channels. This creates the worst state for the 21st channel.

The variable delay line 54 sets a temporal shift of the bit slots of the optical signal output from the modulator 52 and the optical signal output from the modulator 53 to be approximately 0.5 bit at the output end of the booster EDFA 56. In this case, results of the basic study conducted by the inventor say that degradation of system characteristics of the 21st channel becomes maximized. Therefore, this setting was used for all evaluations. The SMF 58 used for compensating for a chromatic dispersion of the optical fiber for Raman amplification 41 is disposed before the Raman amplifier 40 as described above. Thus, the temporal shift of the optical signal becomes the same setting at the output end of the Raman amplifier 40.

Figure 14:
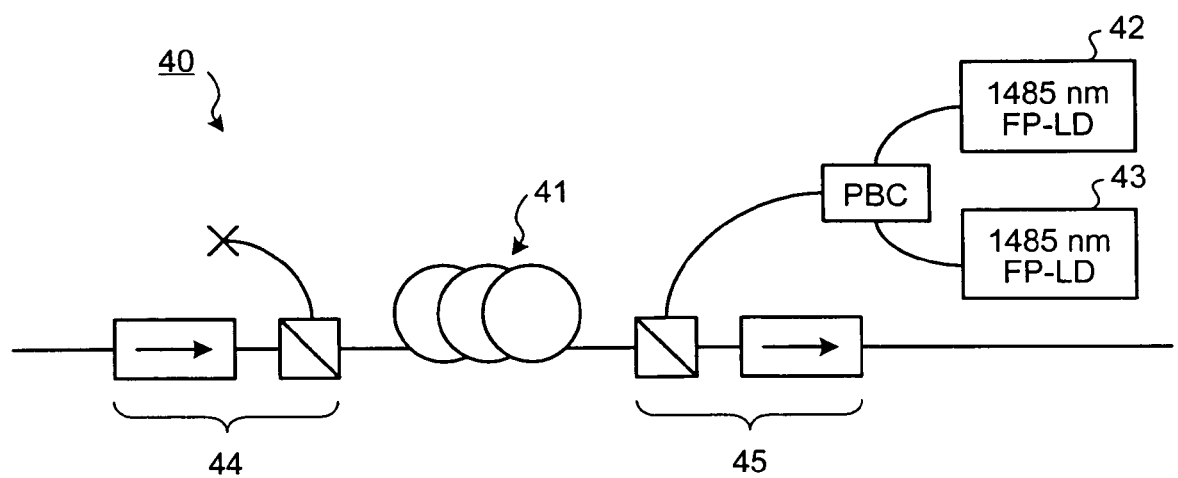
FIG. 14 is a schematic of an example of a Raman amplifier according to the present invention.

The Raman amplifier 40 used in the above evaluation is described next. FIG. 14 is a block diagram of an example of the Raman amplifier 40. As shown in FIG. 14 the Raman amplifier 40 is configured to perform backward pumping. Specifically, the Raman amplifier 40 includes the optical fiber for Raman amplification 41, Fabry-Perot laser diodes 42, 43 having a central wavelength of 1,485 nm, and optical components 44, 45. In this case, the Raman amplifier 40 uses the polarization-combined Fabry-Perot laser diodes 42, 43 as a pumping light source. The power of the pumping light incident in the optical fiber for Raman amplification 41 from the pumping light source was fixed at 410 mW in all experiments.

Figure 15:
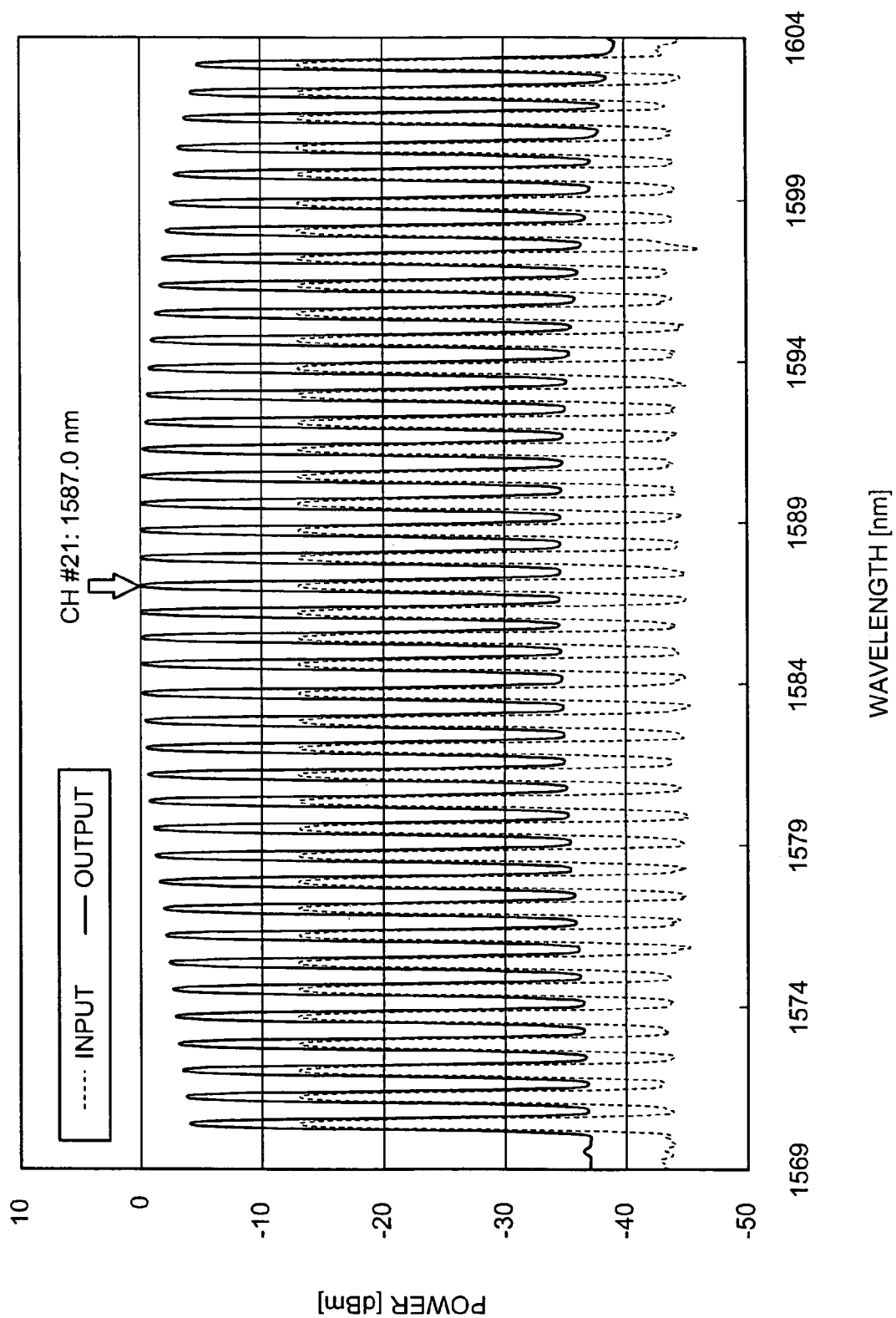
FIG. 15 is a graph of gain characteristics of the Raman amplifier according to the present invention.

The optical components. 44, 45 include an isolator and a WDM coupler, and are disposed at the front stage and the back stage of the optical fiber for Raman amplification 41, respectively. The losses of the optical components 44, 45 were 0.7 dB and 0.85 dB, respectively. FIG. 15 is a graph depicting an example of gain characteristics of the Raman amplifier 40 evaluated by the WDM system 703. The Raman gain efficiency of the optical fiber for Raman amplification 41 was approximately 6.3 $[(W \times km)^{-1}]$ with a pumping light of the wavelength of 1,450 nm. The fiber length of the optical fiber for Raman amplification 41 was 2 km, and the loss at the wavelength 1,450 nm was approximately 0.8 dB/km. As shown in FIG. 15, in the Raman amplifier 40, the gain is maximized in the vicinity of the 21st channel. In this case, the gain flatness in the overall band is large at 4 dB to 5 dB, while the flat ness is within 1 dB at around the 20th channel in the center.

Referring back to the WDM system 703 shown in FIG. 13, the WDM signal output from the Raman amplifier 40 that is the evaluation object passes through an SMF 59 that converts a phase noise caused by XPM to an intensity noise, and is then input to a receiver 30 using an optical preamplifier. The length of the SMF 59 is set at 50 km. If the length of the SMF 59 is short and the chromatic dispersion to be added is too small, the phase noise is not sufficiently converted to the intensity noise, and observation of the penalty due to a nonlinear effect becomes difficult. If the length of the SMF 59 is too long, the penalty caused by chromatic dispersion is too large that the evaluation standard of BER=$10^{-9}$ cannot be achieved. These two points were considered to set the length of the SMF 59 at 50 km.

To suppress the nonlinear effect at the SMF 59 as well as possible, and to maintain the OSNR input to the receiver 30 as high as possible, an inline EDFA 60 is provided at the middle of the SMF 59. Power input into the SMF 59 that is divided in half is −10 dBm/ch or less, respectively. Therefore, the nonlinear effect generated at the SMF 59 is unobservable.

Figure 16:
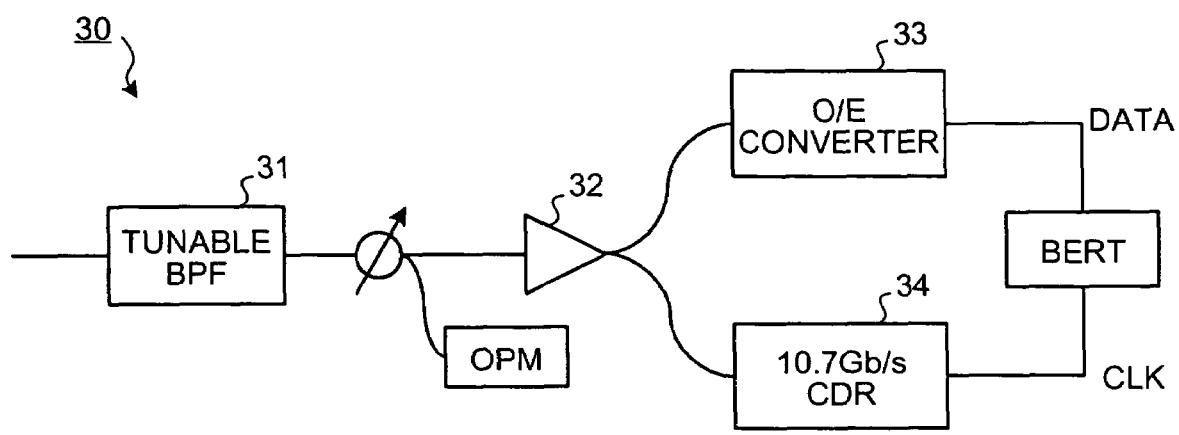
FIG. 16 is a schematic of a receiver in a WDM transmission experiment system.

The receiver 30 of the WDM system 703 is described next. FIG. 16 is a block diagram of an example of the receiver 30. As shown in FIG. 16, the receiver 30 includes a band-pass filter (BPF) 31, an optical preamplifier 32, a PIN photo diode 33, and a clock extraction circuit 34. In this case, an optical signal input in the receiver 30 sequentially passes through the BPF 31 and the optical preamplifier 32 for selecting the 21st channel. Subsequently, the optical signal is input in the PIN photo diode 33 and the clock extraction circuit 34, so that the optical signal waveform is converted to electrical one. The receiver 30 uses output from the PIN photo diode 33 and the clock recovery circuit 34 to measure a bit error rate (BER). The optical preamplifier 32 has two stages, a front stage and a back stage, and input power to the front stage is defined as received power. Moreover, in a middle stage of the optical preamplifier 32, a band pass filter is inserted to remove amplified spontaneous emission (ASE) generated in the front stage.

As described above, degradation of receiver sensitivity was examined by employing the WDM system 703, using received power (receiver sensitivity) necessary for achieving a BER of $10^{-9}$ as an evaluation standard of system characteristics, and changing output of the Raman amplifier 40 and the type of optical fiber for Raman amplification 41. Specifically, a plurality of optical fibers for Raman amplification having different chromatic dispersion were used, and the correlation between the amplifier output power and the sensitivity was examined for each optical fiber for Raman amplification, in a case when there is an affect of the XPM and in a case when there is no affect of the XPM. The above-mentioned degradation of system characteristics are evaluated from results of examining the degradation of the sensitivity.

Figure 17:
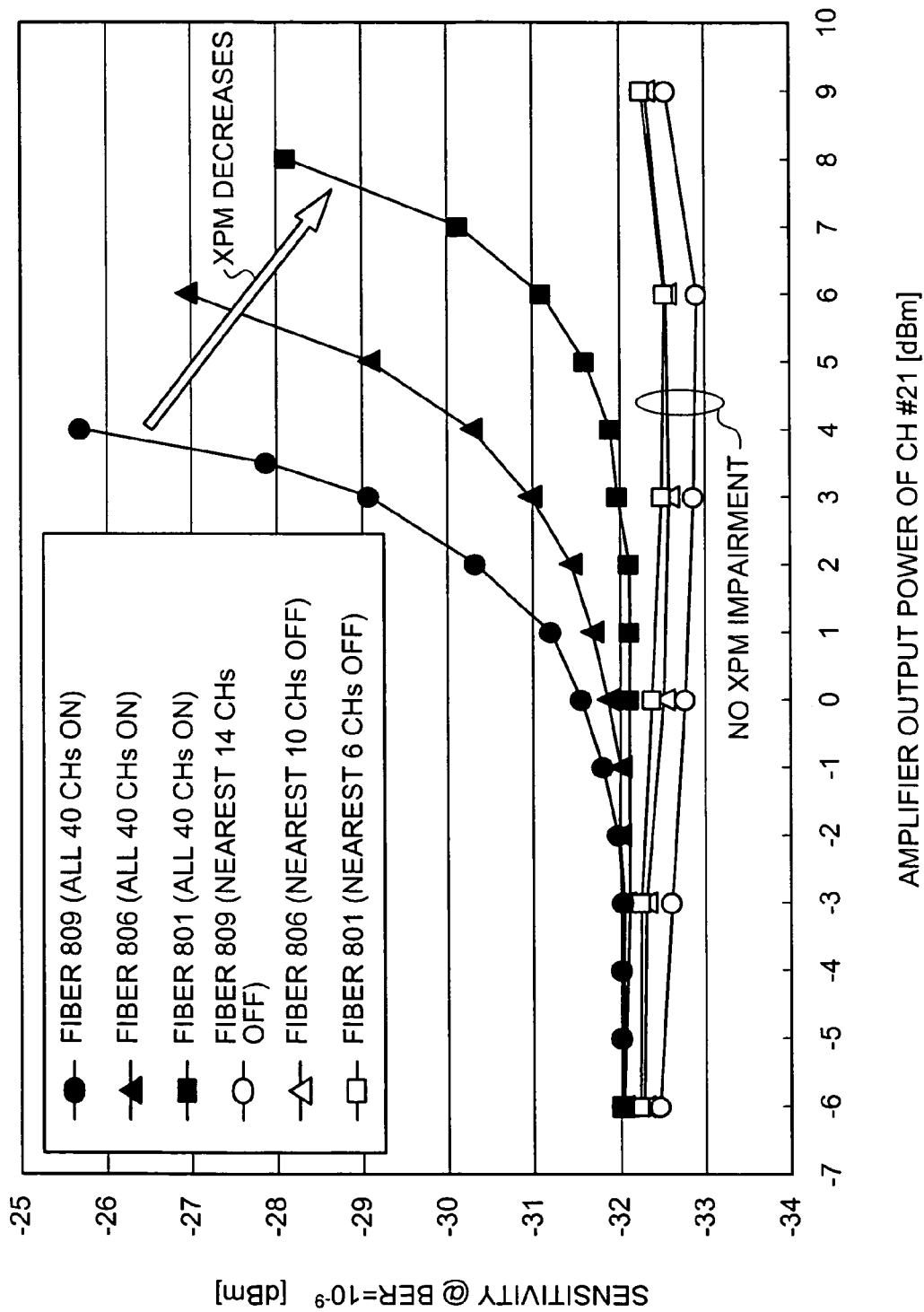
FIG. 17 is a graph of a relationship between dispersion and degradation of system characteristics caused by the XPM in the optical fiber for Raman amplification.

FIG. 17 depicts a relationship between the chromatic dispersion and degradation of system characteristics caused by the XPM in the optical fiber for Raman amplification according to the present invention. In the evaluation of degradation of the system characteristics, 2 km each of three types of optical fibers for Raman amplification 801, 806, 809 (having the characteristics shown in FIG. 11) of different chromatic dispersions were used. The correlation between the amplifier output power and the sensitivity was examined for each optical fiber for Raman amplification, in a case when there is an affect of the XPM (using all 40 channels) and in a case when there is no affect of the XPM (not using some adjacent channels). The pumping power used in the evaluation is fixed. Therefore, output of the Raman amplifiers is adjusted by adjusting input power of optical signals in the Raman amplifiers.

As shown in FIG. 17, basically, when there is an affect of the XPM, the sensitivity degrades as the output power of the Raman amplifier rises, and when there is no affect of the XPM, the sensitivity first improves as the output power of the Raman amplifier rises, and then degrades later. Moreover, as shown in FIG. 17, the larger the absolute value of the chromatic dispersions of the optical fibers for Raman amplification 801, 806, 809, the smaller the extent of degradation of the sensitivity caused by the XPM. Therefore, in the optical communication system including the Raman amplifier 40 employing the optical fiber for Raman amplification 41 as an amplifying medium, degradation of the sensitivity caused by the XPM can be suppressed by increasing the absolute value of the chromatic dispersion of the optical fiber for Raman amplification 41.

The number of adjacent channels to be reduced in order to eliminate an effect of the XPM is changed for each fiber, judging from results of the basic study conducted by the inventor. In this case, the number of adjacent channels is smaller when the fiber has a large absolute value of the chromatic dispersion and is less affected by the XPM. Among the above-mentioned three types of optical fibers for Raman amplification used for evaluating degradation of system characteristics (see FIG. 17), the optical fibers for Raman amplification 806, 809 can be considered to have substantially the same characteristics excluding the chromatic dispersion. Meanwhile, the optical fiber for Raman amplification 801 has a large effective area $A_{eff}$ by increasing an absolute value of the chromatic dispersion. Therefore, the optical fiber for Raman amplification 801 has a slightly smaller Raman gain efficiency ($g_R/A_{eff,R}$) and a nonlinear coefficient ($n_2/A_{eff,s}$) compared to the optical fibers for Raman amplification 806, 809.

When evaluating degradation of system characteristics, various conditions of the WDM system 703 are set so that the XPM becomes maximized in the optical fiber for Raman amplification. However, at the output end of the Raman amplifier where the optical signal power becomes maximum, it is very peculiar if on and off of a plurality of adjacent channels are synchronized. In the plurality of adjacent channels, each bit value needs to at least be uncorrelated. For this reason, the length of the SMF 58 provided at the front stage of the Raman amplifier 40 was appropriately adjusted so that adjacent channels that are 100 GHz apart can temporally shift by exactly 2 bits at the output end of the Raman amplifier 40. With this configuration, the bit slots of a plurality of adjacent channels affecting on the 21st channel can be aligned at the output end of the Raman amplifier 40, and data of each channel can be made random. By using the WDM system 703 employing the above configuration, the examination can be conducted under the worst condition realistically possible in the actual optical communication system. In this case, the length of the SMF 59 finally added to the WDM system 703 was adjusted so that the overall chromatic dispersion of the entire WDM system 703 is kept constant.

Figure 18:
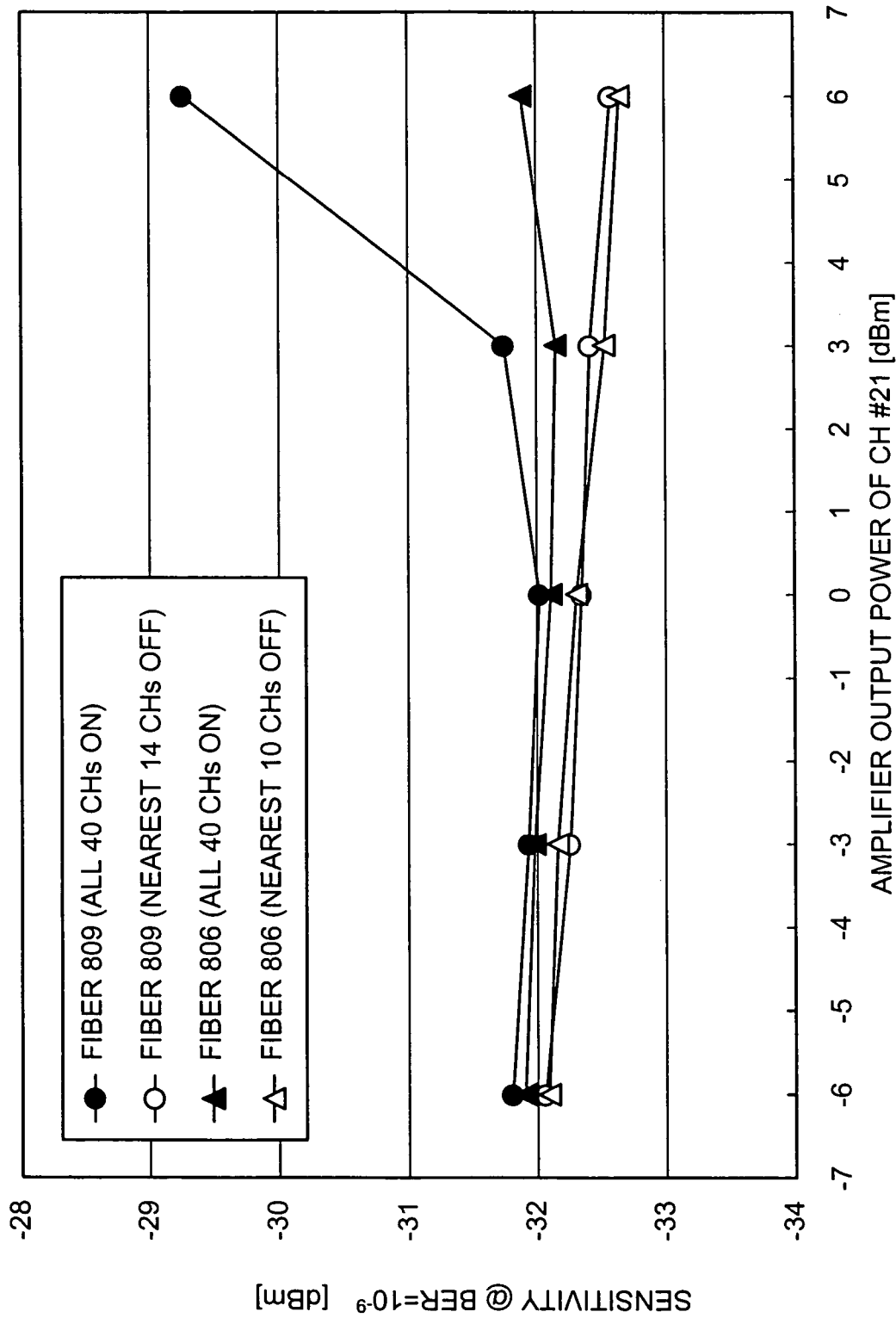
FIG. 18 is a graph for illustrating degradation of system characteristics caused by the XPM when data between adjacent channels are uncorrelated.

FIG. 18 depicts the degradation of system characteristics caused by the XPM when data between adjacent channels are uncorrelated. In FIG. 18, results of evaluating the optical fibers for Raman amplification 806, 809 by using the above-described method are shown as results of evaluation of degradation of system characteristics.

A bit period at 10.664 Gb/s is 93.8 ps, and a wavelength difference corresponding to a frequency difference of 100 GHz at 1,587 nm is approximately 0.84 nm. Further, when the optical fiber for Raman amplification 809 is used as the optical fiber for Raman amplification 41, the total chromatic dispersion is −42 ps/nm, and when the optical fiber for Raman amplification 806 is used as the optical fiber for Raman amplification 41, the total chromatic dispersion is −87 ps/nm. Therefore, when the optical fiber for Raman amplification 809 is used, the SMF 58 of 256 ps/nm is disposed at the front stage of the Raman amplifier 40, and when the optical fiber for Raman amplification 806 is used, the SMF 58 of 310 ps/nm is disposed at the front stage of the Raman amplifier 40. Accordingly, the accumulated chromatic dispersion at the output end of the Raman amplifier 40 becomes 223 ps/nm. This corresponds to a delay of two times of 93.8 ps every time the wavelength shifts 0.84 nm.

As shown in FIG. 18, when the optical fiber for Raman amplification 809 is used, the sensitivity corresponding to amplifier output power of −6 dBm/ch is approximately the same as the sensitivity that corresponds to amplifier output power of +3 dBm/ch. Further, when the optical fiber for Raman amplification 806 is used, the sensitivity corresponding to amplifier output power of −6 dBm/ch is approximately the same as the sensitivity that corresponds to amplifier output power of +6 dBm/ch. In other words, when the optical fiber for Raman amplification 809 is used, the amplifier output power of approximately +3 dBm/ch (amplifying fiber output of +3.85 dBm/ch) is the upper threshold of the amplifier output power that can suppress the degradation of system characteristics caused by the XPM, which is the sensitivity degradation, at the same or lower level than that of sensitivity degradation caused by only chromatic dispersion. Further, when the optical fiber for Raman amplification 806 is used, the amplifier output power of approximately +6 dBm/ch (amplifying fiber output of +6.85 dBm/ch) is the upper threshold of the amplifier output power that can suppress the degradation of system characteristics caused by the XPM at the same or lower level than that of sensitivity degradation caused by only chromatic dispersion.

Generally, the effect of the XPM increases in proportion to power of a signal light, and the interaction length is in approximate inverse proportion to the product of chromatic dispersion of the fiber and wavelength intervals of the WDM signals. Based on this principle, the results shown in FIG. 18 are analyzed. Assuming that the upper threshold of the XPM that can suppress the degradation of system characteristics caused by optical signals after amplification at the same or lower level than that of sensitivity degradation caused by only chromatic dispersion is X, this XPM upper-threshold X can be expressed by Equation (6), using an output power P[mW] of the optical fiber for Raman amplification, a chromatic dispersion D [ps/nm/km] of the optical fiber for Raman amplification, and a wavelength interval S [nm] of WDM signal.

$$X = k \times \frac{P[\text{mW}]}{D \times X[\text{ps/km}]} \qquad (6)$$

$$= k \times \frac{10^{0.385}[\text{mW}]}{-21.0 \times 0.84[\text{ps/km}]}$$

$$= k \times \frac{10^{0.685} [\text{mW}]}{-43.3 \times 0.84 [\text{ps/km}]}$$

where, k represents a proportional coefficient.

From Equation (6), the upper threshold Dmax of a chromatic dispersion value required of the optical fiber for Raman amplification is determined by a condition of the system, i.e., the output power P of the optical fiber for Raman amplification and the wavelength interval S of WDM signal. Accordingly, this is expressed by Equations (7) and (8) by using the above-mentioned optical fibers for Raman amplification 809, 806.

$$D\text{max} = -7.27 \times P/S \quad (7)$$

$$D\text{max} = -7.51 \times P/S \quad (8)$$

The upper threshold value Dmax obtained by Equation (7) is the upper threshold value of the chromatic dispersion value when the result of the optical fiber for Raman amplification 809 is used. The upper threshold value Dmax obtained by Equation (8) is the upper threshold value of the chromatic dispersion value when the result of the optical fiber for Raman amplification 806 is used.

The upper threshold value Dmax obtained by Equation (7) and the upper threshold value Dmax obtained by Equation (8) are substantially equal, because the accidental error is approximately 3%. Therefore, according to the present invention, the average value of the upper threshold value Dmax obtained by Equation (7) and the upper threshold value Dmax obtained by Equation (8) is used to define the upper threshold value Dmax of the chromatic dispersion value required of the optical fiber for Raman amplification as $$D\text{max} = -7.39 \times P/S \quad (9)$$

By using Equation (9), any combination of the output power P and the wavelength interval S can derive the upper threshold Dmax of the chromatic dispersion value required of the optical fiber for Raman amplification (for example the optical fiber for Raman amplification 41 that is the amplifying medium of the Raman amplifier 40). However, in a usual system design, typically, the amplifier output power is larger than +3 dBm/ch, and the intervals of WDM signals are 100 GHz. Therefore, in a usual system design, even when the chromatic dispersion value D is equal to or more than −20 ps/nm/km, it is hardly allowed. Accordingly, in a usual system design, the chromatic dispersion value in the wavelength of 1,550 nm is required to be −20 ps/nm/km or less for the optical fiber for Raman amplification that is exemplified by the optical fibers for Raman amplification 801 to 809.

The present embodiment is not limited to the examples of the optical fiber for Raman amplification, the optical fiber coil, the Raman amplifier and the optical communication system described above. The detailed configurations and operations of the optical fibers for Raman amplification, the optical fiber coils 110, 115, 130, the Raman amplifiers 10, 20, 25, and the optical communication systems 700, 701, 702 can be modified appropriately without departing from the spirits of the invention.

According to the present invention, it is possible to increase the Raman gain efficiency while suppressing the nonlinear coefficient.

Furthermore, according to the present invention, it is possible to perform Raman amplification of a signal light in a highly efficient manner.

Moreover, according to the present invention, it is possible to suppress degradation of waveform of a signal light caused by effect of nonlinear optical phenomena such as self-phase modulation and cross-phase modulation.

Furthermore, according to the present invention, it is possible to suppress degradation of waveform of a signal light and a pumping light caused by effect of four-wave mixing.

Moreover, according to the present invention, it is possible to use pumping light energy efficiently.

Furthermore, according to the present invention, it is possible to achieve an optimal chromatic dispersion across a broad wavelength band with a center wavelength at 1,550 nm.

Moreover, according to the present invention, it is possible to form an optical fiber coil without causing an increase of loss in a wavelength band equal to or less than 1675 nm.

Furthermore, according to the present invention, it is possible to suppress degradation of waveform of a signal light an a pumping light caused by effect of four-wave mixing when amplifying a signal light in a wavelength band equal to or more than 1460 nm and equal to or less than 1675 nm.

Moreover, according to the present invention, it is possible to use pumping light energy efficiently for a signal light having a wavelength equal to or more than 1460 nm.

Furthermore, according to the present invention, it is possible to suppress a decrease of reliability of an optical fiber due to a bending stress.

Moreover, according to the present invention, it is possible realize a compact size optical fiber coil.

Furthermore, according to the present invention, it is possible to realize a lumped-parameter-type Raman amplifier that allows a compact storage.

Moreover, according to the present invention, the optical fiber for Raman amplification can be easily coupled to an optical component such as an isolator and a WDM coupler.

Furthermore, according to the present invention, it is possible to obtain a high efficiency of amplification with suppression of degradation of waveform of a signal light caused by effect of nonlinear optical phenomena.

Moreover, according to the present invention, it is possible to compensate a chromatic dispersion of a transmission-line optical fiber across a broad wavelength band with Raman amplification in a DCF. With a configuration of using the DCF on an output side, when an amplifier output is the same, it is possible to further reduce degradation of system characteristics due to the nonlinear phenomena.

Furthermore, according to the present invention, it is possible to compensate negative dispersion accumulated by using an optical fiber having a positive-dispersion. With a configuration of using the optical fiber having a positive-dispersion on an output side, when an amplifier output is the same, it is possible to further reduce degradation of system characteristics due to the nonlinear phenomena.

Moreover, according to the present invention, it is possible to perform a long-haul transmission of a signal light, and to suppress degradation of waveform of the signal light due to the nonlinear optical phenomena and the chromatic dispersion.

Furthermore, according to the present invention, it is possible to suppress degradation of waveform of the signal light due to the nonlinear optical phenomena and the chromatic dispersion in a normal system design.

Moreover, according to the present invention, it is possible not only to perform a long-haul transmission of a signal light, but also to an even larger-capacity transmission.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber for Raman amplifying a signal light with a pumping light, the optical fiber comprising:
    a glass part including,
        a first core,
        a second core surrounding the first core, and
        a cladding surrounding the second core; and
    a coating surrounding the glass part,
    wherein a chromatic dispersion at a wavelength of 1,550 nanometers is in a range between −70 ps/nm/km and −30 ps/nm/km,
    a Raman gain efficiency with a pumping light of 1,450 nanometers is equal to or more than 5 $(W \times km)^{-1}$,
    a nonlinear coefficient at the wavelength of 1,550 nanometers is equal to or less than $5.0 \times 10^{-9}$ $W^{-1}$,
    a zero-dispersion wavelength is not at a wavelength of the signal light nor at a wavelength of the pumping light,
    a cut-off wavelength is equal to or less than the wavelength of the pumping light,
    the first core has a relative refractive index difference to the cladding of $\Delta 1$ and the second core has a relative refractive index difference to the cladding of $\Delta 2$ where $\Delta 1$ is 2.2 to 2.8%, and $\Delta 2$ is −0.55 to −0.23%, and
    a ratio of a diameter of the first core to a diameter of the second core is 0.33 or more and 0.48 or less.

2. The optical fiber according to claim 1, wherein an absolute value of a dispersion slope at the wavelength of 1,550 nanometers is equal to or less than 0.05 $ps/nm^2/km$.

3. The optical fiber according to claim 1, wherein a bending loss at a diameter of 20 millimeters at the wavelength of 1,550 nanometers is equal to or less than 0.1 dB/m.

4. The optical fiber according to claim 1, wherein the zero-dispersion wavelength is equal to or less than 1,350 nanometers or equal to or more than 1,675 nanometers.

5. The optical fiber according to claim 1, wherein the cut-off wavelength is equal to or less than 1,350 nanometers.

6. The optical fiber according to claim 1, wherein outer diameter of the glass part is equal to or less than 100 micrometers.

7. The optical fiber according to claim 1, wherein outer diameter of the coating is equal to or less than 150 micrometers.

* * * * *